United States Patent [19]
Finlayson et al.

[11] Patent Number: 6,054,544
[45] Date of Patent: Apr. 25, 2000

[54] ULTRA-LOW MOLECULAR WEIGHT ETHYLENE POLYMERS

[75] Inventors: Malcolm F. Finlayson, Houston; Craig C. Garrison, Lake Jackson; Ralph E. Guerra, Lake Jackson; Martin J. Guest, Lake Jackson; Brian W. S. Kolthammer, Lake Jackson; Deepak R. Parikh, Lake Jackson; Steven M. Ueligger, Angleton, all of Tex.

[73] Assignee: The Dow Chemical Company, Midland, Mich.

[21] Appl. No.: 08/784,683

[22] Filed: Jan. 22, 1997

Related U.S. Application Data

[60] Provisional application No. 60/010,403, Jan. 22, 1996, and provisional application No. 60/030,894, Nov. 13, 1996.

[51] Int. Cl.[7] ............................. C08F 210/02; C08F 4/42; C08F 4/602

[52] U.S. Cl. ................... 526/348; 526/348.2; 526/348.3; 526/348.4; 526/348.5; 526/348.6; 526/348.7; 526/133; 526/160; 585/12

[58] Field of Search ................. 526/348.6, 852, 526/347, 348, 348.2, 348.3, 348.4, 348.5, 348.7

[56] References Cited

U.S. PATENT DOCUMENTS

| | | | |
|---|---|---|---|
| 4,914,256 | 4/1990 | Rodewald | 585/726 |
| 4,962,248 | 10/1990 | Winter et al. | 585/12 |
| 4,962,262 | 10/1990 | Winter et al. | 585/512 |
| 5,023,388 | 6/1991 | Luker | 526/160 |
| 5,081,322 | 1/1992 | Winter et al. | 585/9 |
| 5,272,236 | 12/1993 | Lai et al. | 526/348.5 |
| 5,278,272 | 1/1994 | Lai et al. | 526/348.5 |
| 5,391,790 | 2/1995 | Rohrmann et al. | 556/28 |
| 5,453,410 | 9/1995 | Kolthammer et al. | 526/348.6 |
| 5,494,874 | 2/1996 | Rosen et al. | 526/160 |
| 5,525,128 | 6/1996 | McAleer et al. | 44/459 |
| 5,543,484 | 8/1996 | Chung et al. | 526/347 |
| 5,556,928 | 9/1996 | Devore et al. | 526/352 |
| 5,616,747 | 4/1997 | Rohrmann et al. | 556/11 |
| 5,665,800 | 9/1997 | Lai et al. | 524/115 |
| 5,703,187 | 12/1997 | Timmers | 526/347 |
| 5,723,705 | 3/1998 | Hermann et al. | 585/9 |
| 5,750,813 | 5/1998 | Hess et al. | 585/12 |

FOREIGN PATENT DOCUMENTS

| | | | |
|---|---|---|---|
| 0321851 A1 | 6/1989 | European Pat. Off. | C08F 10/02 |
| 0416815 A2 | 3/1991 | European Pat. Off. | C08F 10/00 |
| 0435250 A2 | 7/1991 | European Pat. Off. | C08F 210/02 |
| 0586777 A1 | 3/1994 | European Pat. Off. | C08F 210/16 |
| 0602509 A2 | 6/1994 | European Pat. Off. | C08F 4/62 |
| 0200351 | 11/1996 | European Pat. Off. | C08F 210/16 |
| 9212212 A1 | 7/1992 | WIPO | C09J 123/16 |

OTHER PUBLICATIONS

A. Todo and N. Kashiwa, "Structure and properties of New Olefin Polymers", *Macromolecular Symposia.* vol. 101, pp. 301–308, (1996).

S. Hosoda and A. Uemura, "Effect of the Structural Distribution on the Mechanical Properties of Linear Low–Density Polyethylenes", *Polymer Journal,* vol. 24, No. 9, pp. 939–949, (1992).

Derwent Abstract 515043 (JP 08269140A (Oct. 15, 1996)).
Derwent Abstract 302295 (EP–719802A2 (Jul. 03, 1996)).
Derwent Abstract 193111 (EP–602509 A2 (Jun. 22, 1994)).
Derwent Abstract 075100 (EP–416566A (Mar. 13, 1991)).

*Primary Examiner*—Edward J. Smith

[57] ABSTRACT

The subject invention pertains to a non-pourable homogeneous ultra-low molecular weight ethylene polymer composition and a process for the preparation thereof. Such polymer compositions have longer lamella and a greater degree of crystalline organization than corresponding higher molecular weight materials at an equivalent density.

20 Claims, 25 Drawing Sheets

ULTRA-LOW MOLECULAR WEIGHT ETHYLENE POLYMERS

CROSS REFERENCE TO RELATED APPLICATIONS

This Application is filed under 35 USC 119, claiming priority from U.S. provisional application 60/010,403, filed Jan. 22, 1996, and U.S. provisional application 60/030,894, filed Nov. 13, 1996.

FIELD OF THE INVENTION

The subject invention pertains to ethylene polymers having an ultra-low molecular weight, as evidenced by a low number average molecular weight. In particular, the subject invention pertains to ethylene polymers having a number average molecular weight as determined by gel permeation chromatography of no more than 11,000.

BACKGROUND OF THE INVENTION

U.S. Pat. No. 3,645,992, incorporated by reference herein in its entirety, discloses homogeneous linear ethylene olefin copolymers prepared using a soluble vanadium catalyst. Therein, homogeneous copolymers are defined as polymers in which the comonomer is randomly distributed within a given molecule, and in which all copolymer molecules have the same ethylene to copolymer ratio. The disclosed homogeneous copolymers have a moderately high molecular weight. For instance, as set forth in the Examples, the homogeneous copolymers have a melt index, as measured in accordance with ASTM D-1238, of from less than 0.1 to less than 25 g/10 min.

U.S. Pat. Nos. 5,272,236 and 5,278,272, incorporated by reference herein in their entirety, disclose substantially linear ethylene olefin copolymers prepared using a single site polymerization catalyst. The disclosed substantially linear copolymers are characterized as having from about 0.01 to about 3 long chain branches per 1000 carbons. Unlike the homogeneous copolymers of Elston, the disclosed substantially linear copolymers are characterized by a molecular weight distribution ($M_w/M_n$) which is independent of the $I_{10}/I_2$, as measured in accordance with ASTM D-1238.

Pourable ultra-low molecular weight ethylene polymers for use as oil additives are known in the art. For instance, PCT published application 94/12193 discloses ethylene/butene copolymers having a number average molecular weight between 1500 and 7500 prepared using a biscyclopentadienyl metallocene catalyst. Such polymers are said to exhibit a pour point of −30° C. or less, as determined by ASTM Method No. D97. As set forth in the published application, polymers exhibiting such low pour points do not adversely affect the pour point of a lubricant to which they are added.

Non-pourable ethylene polymers having a narrow molecular weight distribution, i.e., an $M_w/M_n$ less than 2.5, and an ultra-low molecular weight, as evidenced by a number average molecular weight (Mn) of no more than 11,000, have been heretofore unknown. Industry would find advantage in such polymers for use in adhesive formulations, and as wax substitutes, ink modifiers, oil modifiers, viscosity modifiers, fibers, processing aids, sealants, caulks, etc.

SUMMARY OF THE INVENTION

Accordingly, the present invention further provides a non-pourable homogeneous ultra-low molecular weight ethylene polymer which is characterized as having a number average molecular weight (Mn), as determined by gel permeation chromatography, of no more than 11,000, and a molecular weight distribution ($M_w/M_n$), as determined by gel permeation chromatography, of from 1.5 to 2.5.

The present invention further provides a non-pourable homogeneous ultra-low molecular weight ethylene polymer having longer lamella and a greater degree of crystalline organization than corresponding higher molecular weight materials at an equivalent density. In one instance, the present invention provides a non-pourable homogeneous ultra-low molecular weight semicrystalline ethylene/α-olefin interpolymer having a density less than 0.900 g/cm³ characterized as having lamella greater than 40 nanometers in length when viewed using transmission electron microscopy.

The present invention further provides a process for preparing the non-pourable homogeneous ultra-low molecular weight ethylene polymers of the invention comprising: reacting ethylene and at least one ethylenically unsaturated comonomer at a reaction temperature of at least 80° C. in the presence of a constrained geometry catalyst to form a non-pourable homogeneous ultra-low molecular weight ethylene polymer which is characterized as having a number average molecular weight (Mn) of no more than 11,000, and a molecular weight distribution, $M_w/M_n$, as determined by gel permeation chromatography, of from 1.5 to 2.5.

These and other embodiments of the claimed invention are more fully set forth in the Detailed Description set forth below.

TEST PROCEDURES

Figure 1B:
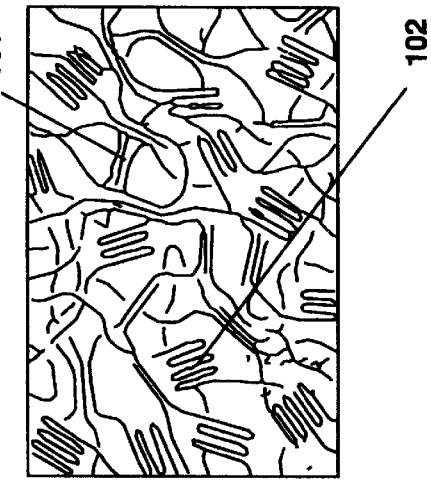
FIG. 1(b) is a simplified representation of features of a transmission electron micrograph of a homogeneous ethylene/1-octene copolymer having a density of from 0.88 to 0.91 g/cm³ and an $I_2$ of 1 g/10 min.

Unless indicated otherwise, the following testing procedures are to be employed:

Density is measured in accordance with ASTM D-792. The samples are annealed at ambient conditions for 24 hours before the measurement is taken.

Melt index ($I_2$), is measured in accordance with ASTM D-1238, condition 190° C./2.16 kg (formally known as "Condition (E)").

Molecular weight is determined using gel permeation chromatography (GPC) on a Waters 150° C. high temperature chromatographic unit equipped with three mixed porosity columns (Polymer Laboratories 103, 104, 105, and 106), operating at a system temperature of 140° C. The solvent is 1,2,4-trichlorobenzene, from which 0.3 percent by weight solutions of the samples are prepared for injection. The flow rate is 1.0 mL/min. and the injection size is 100 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Word in Journal of Polymer Science, Polymer Letters, Vol. 6, (621) 1968, incorporated herein by reference) to derive the following equation:

$$M_{polyethylene} = a*(M_{polystyrene})b.$$

In this equation, a=0.4316 and b=1.0. Weight average molecular weight, $M_w$, is calculated in the usual manner according to the following formula: $M_w = \Sigma w_i * M_i$, where $w_i$ and $M_i$ are the weight fraction and molecular weight, respectively, of the ith fraction eluting from the GPC column.

Melt viscosity is determined in accordance with the following procedure using a Brookfield Laboratories DVII+ Viscometer in disposable aluminum sample chambers. The spindle used is a SC-31 hot-melt spindle, suitable for measuring viscosities in the range of from 10 to 100,000 centipoise. A cutting blade is employed to cut samples into pieces small enough to fit into the 1 inch wide, 5 inches long sample chamber. The sample is placed in the chamber, which is in turn inserted into a Brookfield Thermosel and locked into place with bent needle-nose pliers. The sample chamber has a notch on the bottom that fits the bottom of the Brookfield Thermosel to ensure that the chamber is not allowed to turn when the spindle is inserted and spinning. The sample is heated to 350° F., with additional sample being added until the melted sample is about 1 inch below the top of the sample chamber. The viscometer apparatus is lowered and the spindle submerged into the sample chamber. Lowering is continued until brackets on the viscometer align on the Thermosel. The viscometer is turned on, and set to a shear rate which leads to a torque reading in the range of 30 to 60 percent. Readings are taken every minute for about 15 minutes, or until the values stabilize, which final reading is recorded.

Percent crystallinity is determined by differential scanning calorimetry using a Perkin-Elmer DSC 7. The percent crystallinity may be calculated with the equation:

$$\% \ C = (A/292 \ J/g) \times 100,$$

wherein % C represents the percent crystallinity and A represents the heat of fusion of the ethylene in Joules per gram (J/g).

DETAILED DESCRIPTION

The ultra-low molecular weight ethylene polymer of the invention will be a homopolymer or an interpolymer of ethylene with at least one ethylenically unsaturated monomer, conjugated or nonconjugated diene, polyene, etc. The term "interpolymer" is used herein to indicate a copolymer, or a terpolymer, or the like. That is, at least one other comonomer is polymerized with ethylene to make the interpolymer.

When the ultra-low molecular weight ethylene polymer is an interpolymer, preferred comonomers include the $C_3$–$C_{20}$ α-olefins, especially propene, isobutylene, 1-butene, 1-hexene, 4-methyl-1-pentene, and 1-octene. Other preferred monomers include styrene, or alkyl-substituted styrenes, tetrafluoroethylene, vinylbenzocyclobutene, 1,4-hexadiene, and naphthenics (e.g., cyclopentene, cyclohexene and cyclooctene).

The ultra-low molecular weight ethylene polymers of the invention will be characterized by a number average molecular weight of less than 11,000, preferably less than 10,000. Using the process of the invention, number average molecular weights of less than 5000 may be obtained. However, typically, the number average molecular weight of the polymers will be greater than 2500.

Number average molecular weight is related to the viscosity at 350° F. of the ultra-low molecular weight ethylene polymers. The ultra-low molecular weight ethylene polymers will be characterized by a melt viscosity at 350° F. of less than about 8200, preferably less than 6000, with melt viscosities at 350° F. of less than about 600 centipoise being easily attained.

Further, the number average molecular weight of the ultra-low molecular weight ethylene polymers is related to the melt index ($I_2$). Note, however, that for the ultra-low molecular weight ethylene polymers of the invention, melt index is not measured, but is calculated from viscosity correlations. The ultra-low molecular weight ethylene polymers will be characterized by a calculated melt index ($I_2$) at 190° C. of greater than 1000, preferably of greater than 1300, with polymers having calculated melt indices of at least 10,000 g/10 min. being easily attained.

The ultra-low molecular weight ethylene polymers will typically have a density of from 0.850 to 0.970 g/cm³. The density employed will be a function of the end use application contemplated. For instance, when the polymer is intended as a wax substitute, densities greater than 0.910, preferably greater than 0.920 g/cm³ will be appropriate. In contrast, when the polymer is intended as the strength-imparting component of an adhesive, densities less than 0.900 g/cm³, preferably less than 0.895 g/cm³ will be appropriate. When the ultra-low molecular weight ethylene polymer is an interpolymer of ethylene and an aromatic comonomer, such as styrene, the density of the interpolymer will be less than 1.10 g/cm³.

FIG. 1 sets forth simplified representations of the crystalline structures of homogeneous ethylene/1-octene copolymers and homogeneous ethylene homopolymers having an $I_2$ of 1 g/10 min., prepared with a monocyclopentadienyltitanium single site catalyst. In particular, FIG. 1(a) depicts a homogeneous ethylene/1-octene copolymer having a density of from 0.86 to 0.88 g/cm³; FIG. 1(b) depicts a homogeneous ethylene/1-octene copolymer having a density of from 0.88 to 0.91 g/cm³; FIG. 1(c) depicts a homogeneous ethylene/1-octene copolymer having a density of from 0.91 to 0.93 g/cm³; and FIG. 1(d) depicts a homogeneous ethylene homopolymer having a density greater than 0.95 g/cm³. The depictions set forth in FIGS. 1(a), 1(b), 1(c), and 1(d) are representative of what has been described as Type I, Type II, Type III, and Type IV morphology.

By way of background, short chain branches from the α-olefin comonomer on the ethylene/α-olefin copolymer chain are too big to be incorporated in the crystalline structure and thus interrupt the chain folding/bundling process. When the chain length between comonomer insertion points is shorter than twice the minimum thickness of lamellar crystallites, the polymer chains by definition can no longer crystallize via a chain-folding mechanism. Rather, the chain segments between comonomer insertion points may simply bundle together to form a crystalline hard segment. These bundled chains, known as fringed micelles, have different characteristics than those crystallites formed by the chain-folding process, i.e., lamella.

Theoretically, the minimum thickness of a lamellar crystallite is about 40 angstroms. See, e.g., D. R. Burfield and N. Kashiwa, Makromol. Chem., 186, 2657 (1985). Thus, the chain length between two comonomer insertion points must be at least 80 angstroms to form one fold in the lamellar crystallite. Thus, the population, distribution, and size of the comonomer along the polymer chain will dictate the chain-folding/bundling process and the resulting crystal morphology. Polymer density is an inverse function of comonomer incorporation. Accordingly, lower density polymers, having more comonomer incorporated, will have fewer carbons separating adjacent comonomer insertion points. Thus, as density decreases, the population of lamella likewise decreases.

As the density of the polymer increases, and the number of comonomer insertion points decreases, the length and number of the lamella grows. Further, as the density of the polymer increases, long lamella begin to form which may cause a point of entanglement between adjacent polymer molecules. Such an entangling lamellae is referred to as a "tie chain." At even higher densities, the lamella arrange themselves as spherulites, i.e., the lamella appear to radiate from common nuclei. It is believed that residual catalyst provide a point of origin for the polymer chain crystallizing from the polymer melt to grow.

Figure 1D:
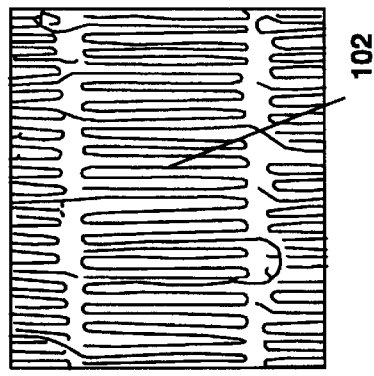
FIG. 1(d) is a simplified representation of features of a transmission electron micrograph of a homogeneous ethylene/1-octene copolymer having a density greater than 0.95 g/cm³ and an $I_2$ of 1 g/10 min.
Figure 1A:
FIG. 1(a) is a simplified representation of features of a transmission electron micrograph of a homogeneous ethylene/1-octene copolymer having a density of from 0.86 to 0.88 g/cm³ and an $I_2$ of 1 g/10 min.
Figure 1C:
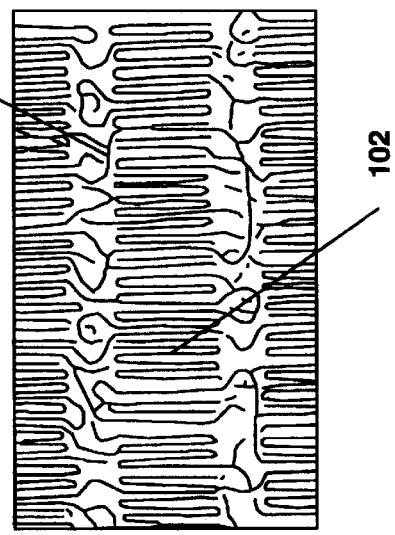
FIG. 1(c) is a simplified representation of features of a transmission electron micrograph of a homogeneous ethylene/1-octene copolymer having a density of from 0.91 to 0.93 g/cm³ and an $I_2$ of 1 g/10 min.

FIG. 1(a) depicts what may be classified as a Type I morphology. Such a morphology is characterized by the presence of bundle-like crystals, i.e., fringed micelles 101. FIG. 1(b) depicts what may be classified as a Type II morphology. Such a morphology is characterized by the presence of fringed micelles 101 and lamella 102. FIG. 1(c) depicts what may be classified as a Type III morphology. Such a morphology is characterized by a lack of fringed micelles and by the presence of thicker lamella 102, tie chains 103, and spherulites (not shown). FIG. 1(d) depicts what may be classified as a Type IV morphology. Such a morphology is characterized by a lack of fringed micelles and tie chains, and by the presence of still thicker lamella 102 and spherulites (not shown).

The ultra-low molecular weight ethylene polymers of the invention have a crystalline structure which is markedly different from that of the higher molecular weight ethylene polymers depicted in FIGS. 1(a), 1(b), 1(c), and 1(d). In particular, as evidenced by the transmission electron micrographs set forth in FIGS. 3 through 9, the ultra-low molecular weight ethylene polymers of the invention have a molecular architecture which is suggestive of more highly crystalline segments than characteristic of higher molecular weight polymers of equivalent density.

For instance, on the basis of FIG. 1(a), homogeneous ethylene/1-octene copolymers having a density of 0.870 g/cm$^3$ and an I$_2$ of 1 g/10 min. would be expected to exhibit fringed micelles, but no lamella, when viewed using transmission electron microscopy. However, (as shown in FIG. 3(c)), ultra-low molecular weight ethylene/1-octene polymers of the invention which have a density of 0.871 g/cm$^3$ and an Mn of 9100, and (as shown in FIG. 3(d)), ultra-low molecular weight ethylene/1-octene polymers of the invention which have a density of 0.870 g/cm$^3$ and an Mn of 4,300, exhibit both fringed micelles and a significant number of lamella, when viewed using transmission electron microscopy.

Further, on the basis of FIG. 1(d), homogeneous ethylene/1-octene copolymers having a density of 0.960 g/cm$^3$ and an I$_2$ of 1 g/10 min. would be expected to exhibit lamella and spherulites, when viewed using transmission electron microscopy. However, (as shown in FIG. 7(b)), ultra-low molecular weight ethylene/1-octene polymers of the invention which have a density of 0.963 g/cm$^3$ and an Mn of 8,000, and (as shown in FIG. 7(c)), ultra-low molecular weight ethylene/1-octene polymers of the invention which have a density of 0.968 g/cm$^3$ and an Mn of 3,700, exhibit no spherulites, but rather exhibit very long lamella, which are believed to result from epitaxial crystallization. Epitaxial crystallization refers to the growth of a crystal upon an existing crystalline substrate, wherein the newly formed crystal adopts the crystalline structure of the substrate.

Figure 2A:
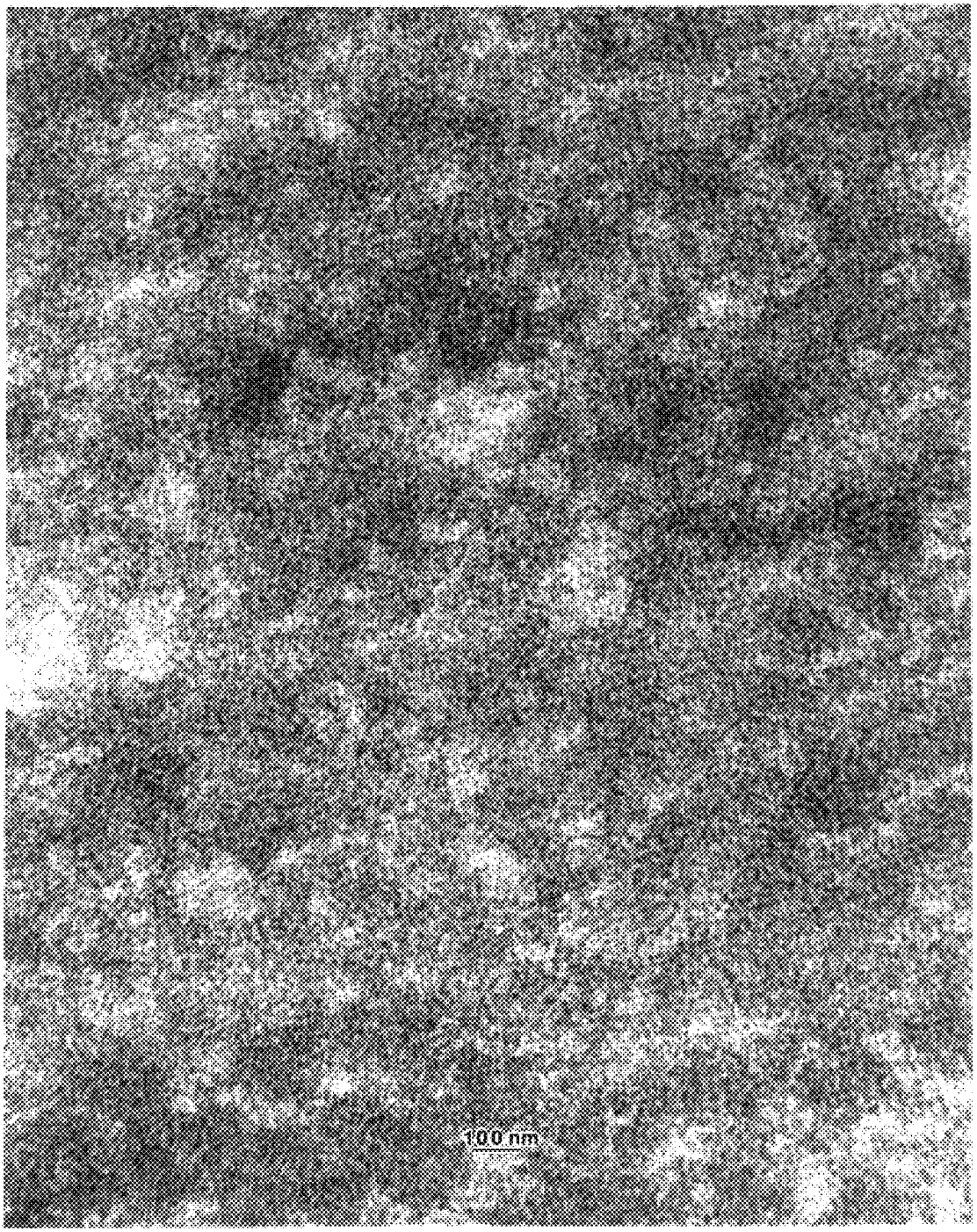
FIG. 2(a) is a transmission electron micrograph, at a magnification of 90,000 times, of an ethylene/1-octene copolymer having a density of 0.855 g/cm³ and an $I_2$ of 0.5 g/10 min.
Figure 2B:
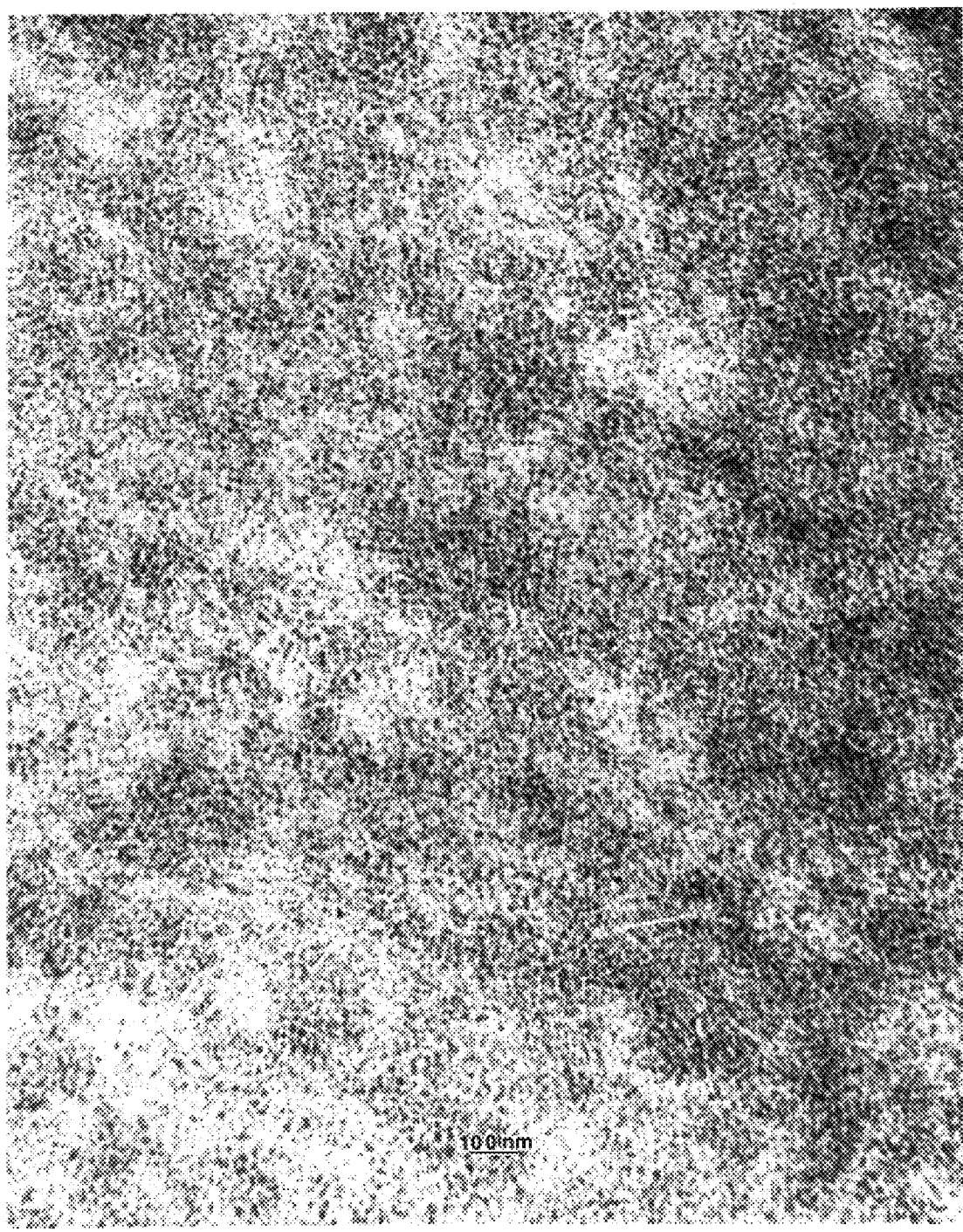
FIG. 2(b) is a transmission electron micrograph, at a magnification of 90,000 times, of the ultra-low molecular weight polymer of Example 1 (an ethylene/1-octene copolymer having a density of 0.855 g/cm³, an Mn of 4,600, and a melt viscosity at 350° F. of 350 centipoise)
Figure 6A:
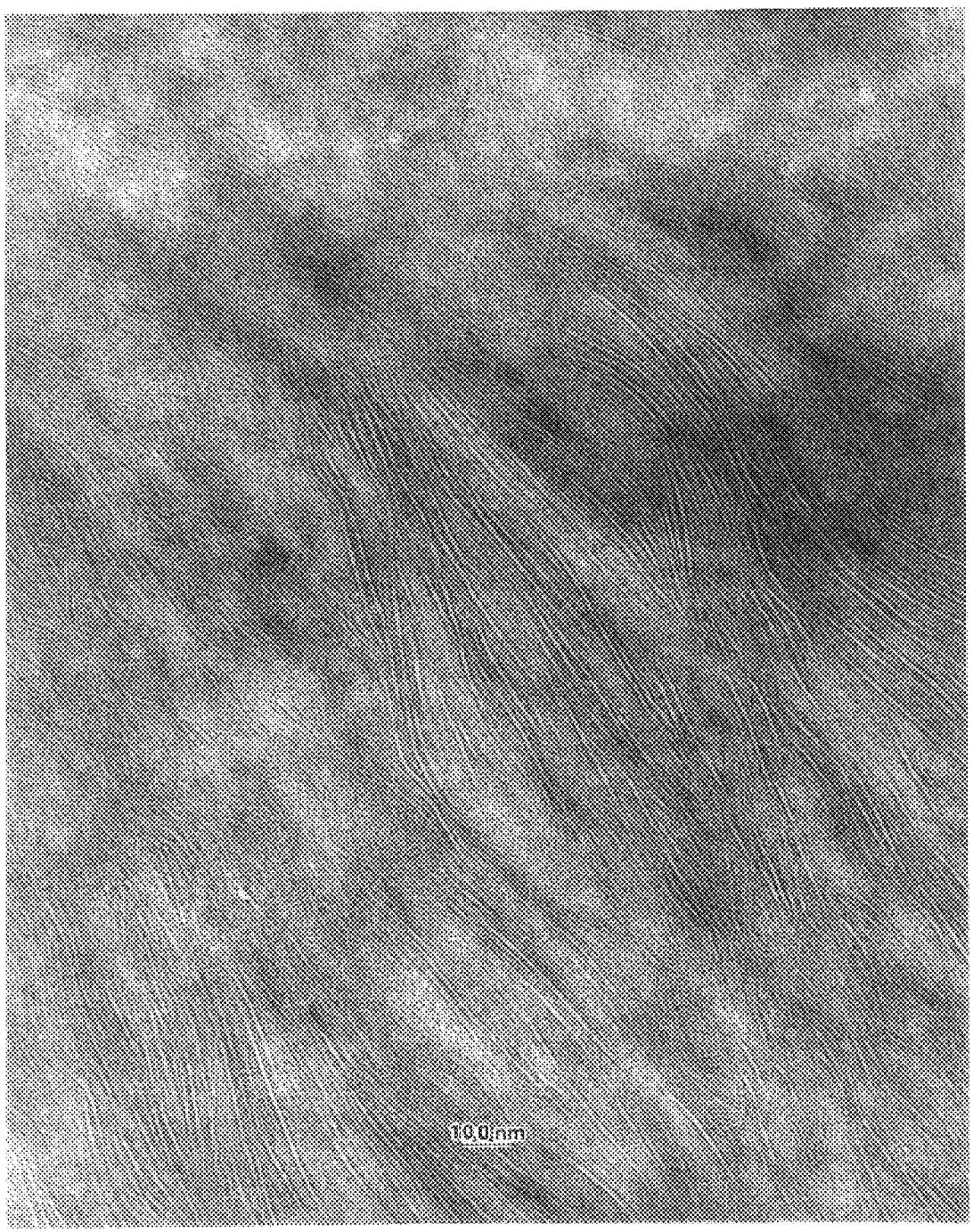
FIG. 6(a) is a transmission electron micrograph, at a magnification of 90,000 times, of the ultra-low molecular weight polymer of Example 5 (an ethylene/1-octene copolymer having a density of 0.929 g/cm³, an Mn of 8,900, and a melt viscosity at 350° F. of 5600 centipoise)
Figure 6B:
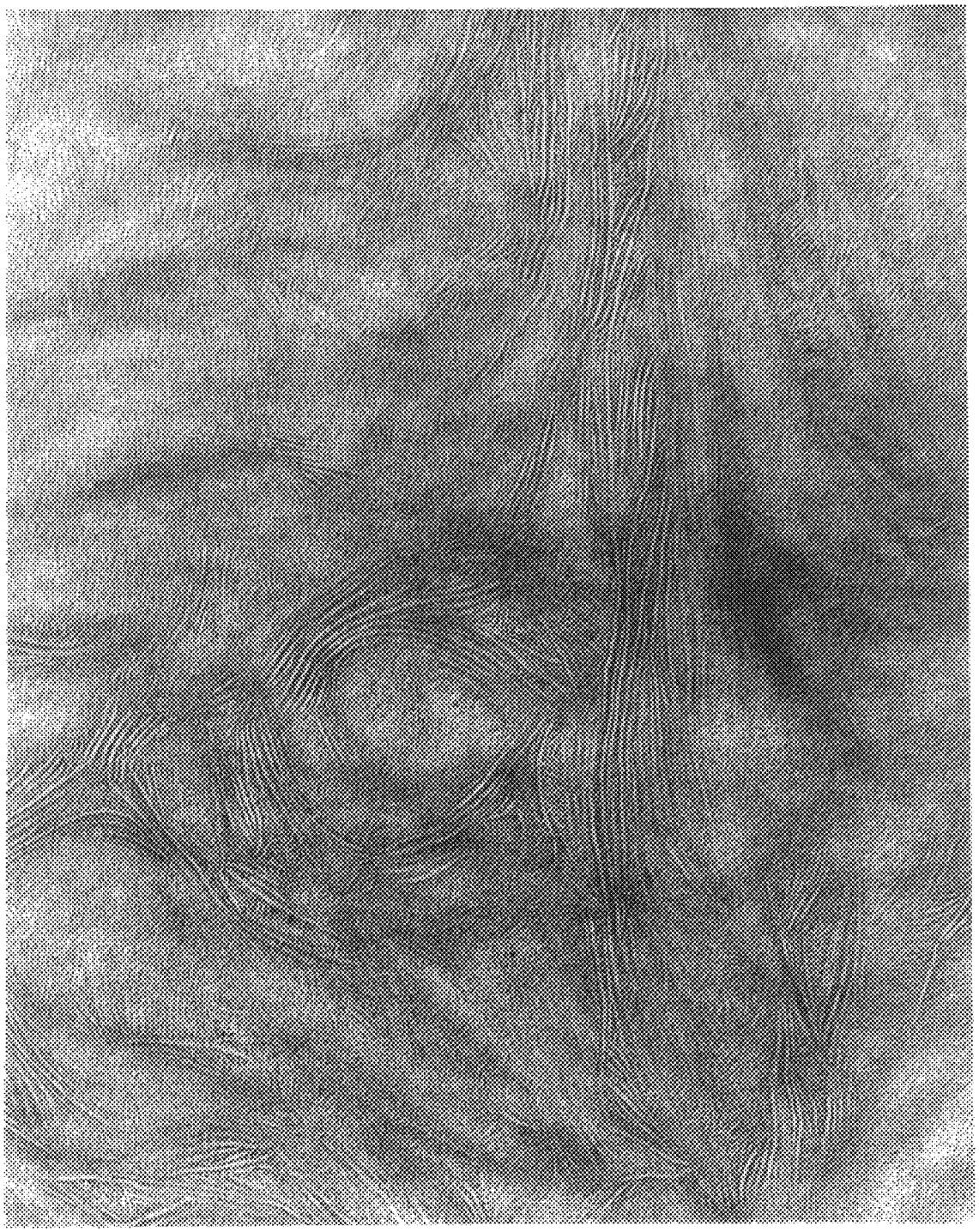
FIG. 6(b) is a transmission electron micrograph, at a magnification of 90,000 times, of the ultra-low molecular weight polymer of Example 18 (an ethylene/1-octene copolymer having a density of 0.930 g/cm³, an Mn of 4,700, and a melt viscosity at 350° F. of 400 centipoise)
Figure 7A:
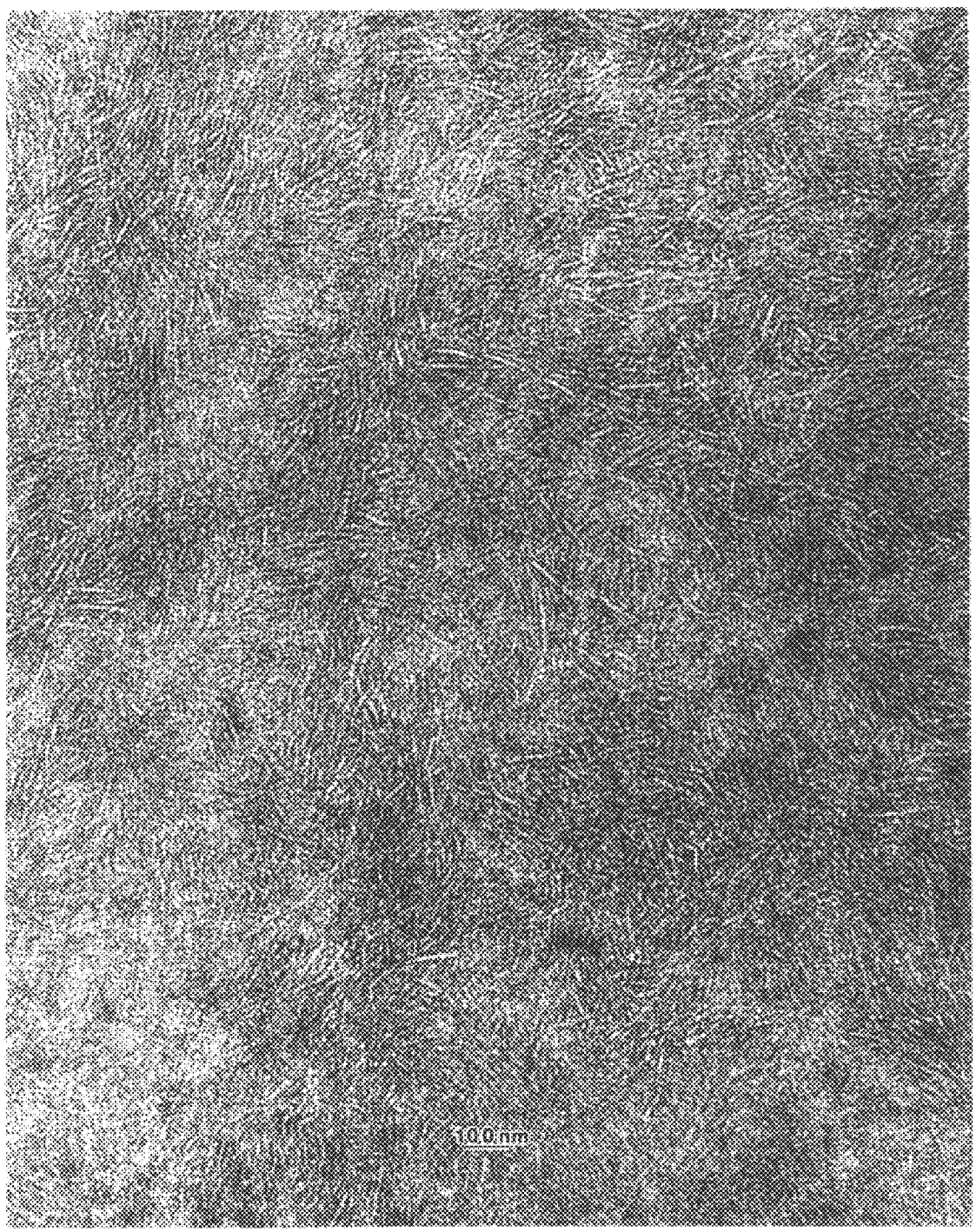
FIG. 7(a) is a transmission electron micrograph, at a magnification of 90,000 times, of a substantially linear ethylene homopolymer having a density of 0.960 g/cm³ and an $I_2$ of g/10 min.
Figure 7B:
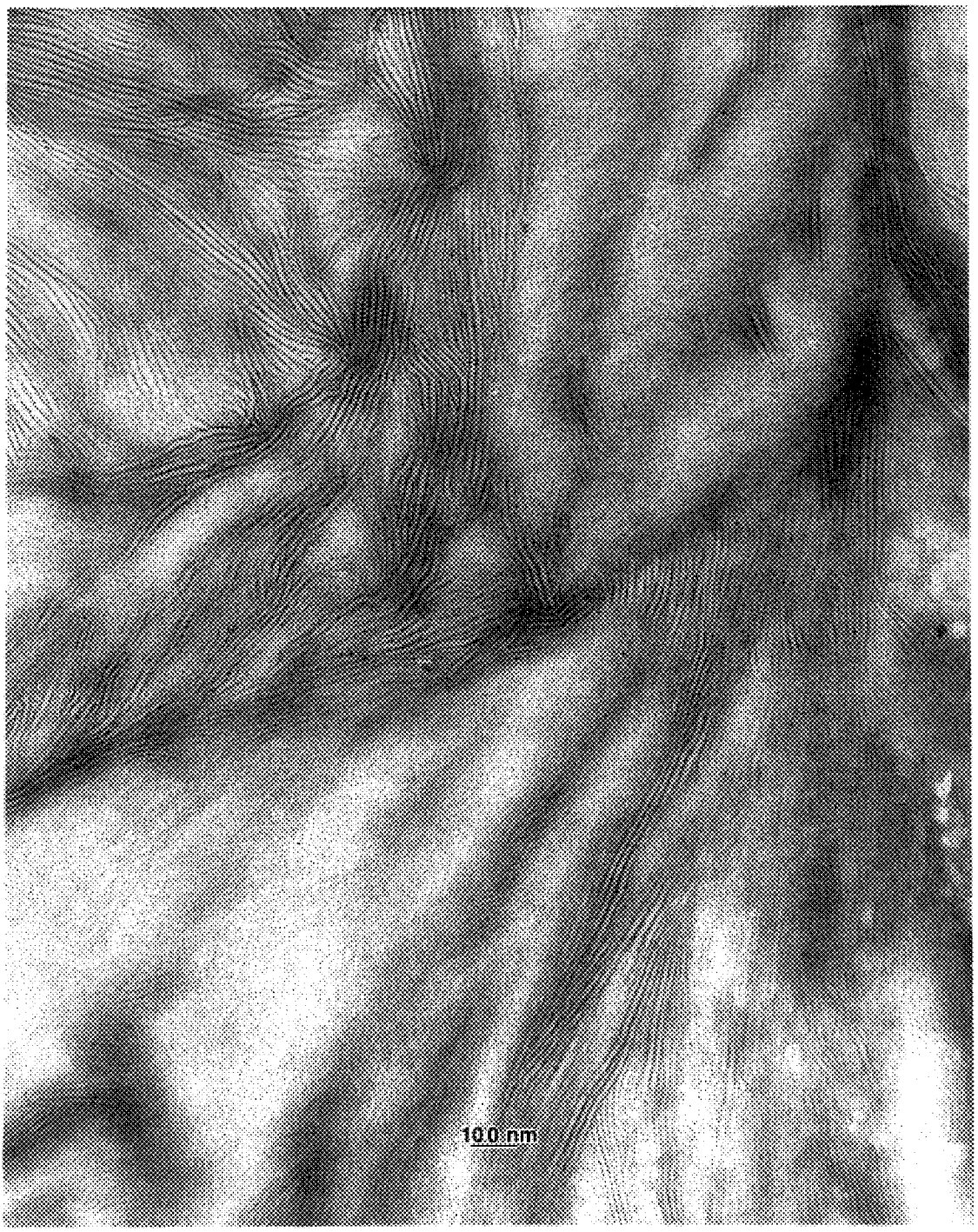
FIG. 7(b) is a transmission electron micrograph, at a magnification of 90,000 times, of the ultra-low molecular weight polymer of Example 6 (an ethylene/1-octene copolymer having a density of 0.963 g/cm³, an Mn of 8,000, and a melt viscosity at 350° F. of 5200 centipoise)
Figure 7C:
FIG. 7(c) is a transmission electron micrograph, at a magnification of 90,000 times, of the ultra-low molecular weight polymer of Example 7 (an ethylene/1-octene copolymer having a density of 0.968 g/cm³, an Mn of 3,700, and a melt viscosity at 350° F. of 395 centipoise)
Figure 8:
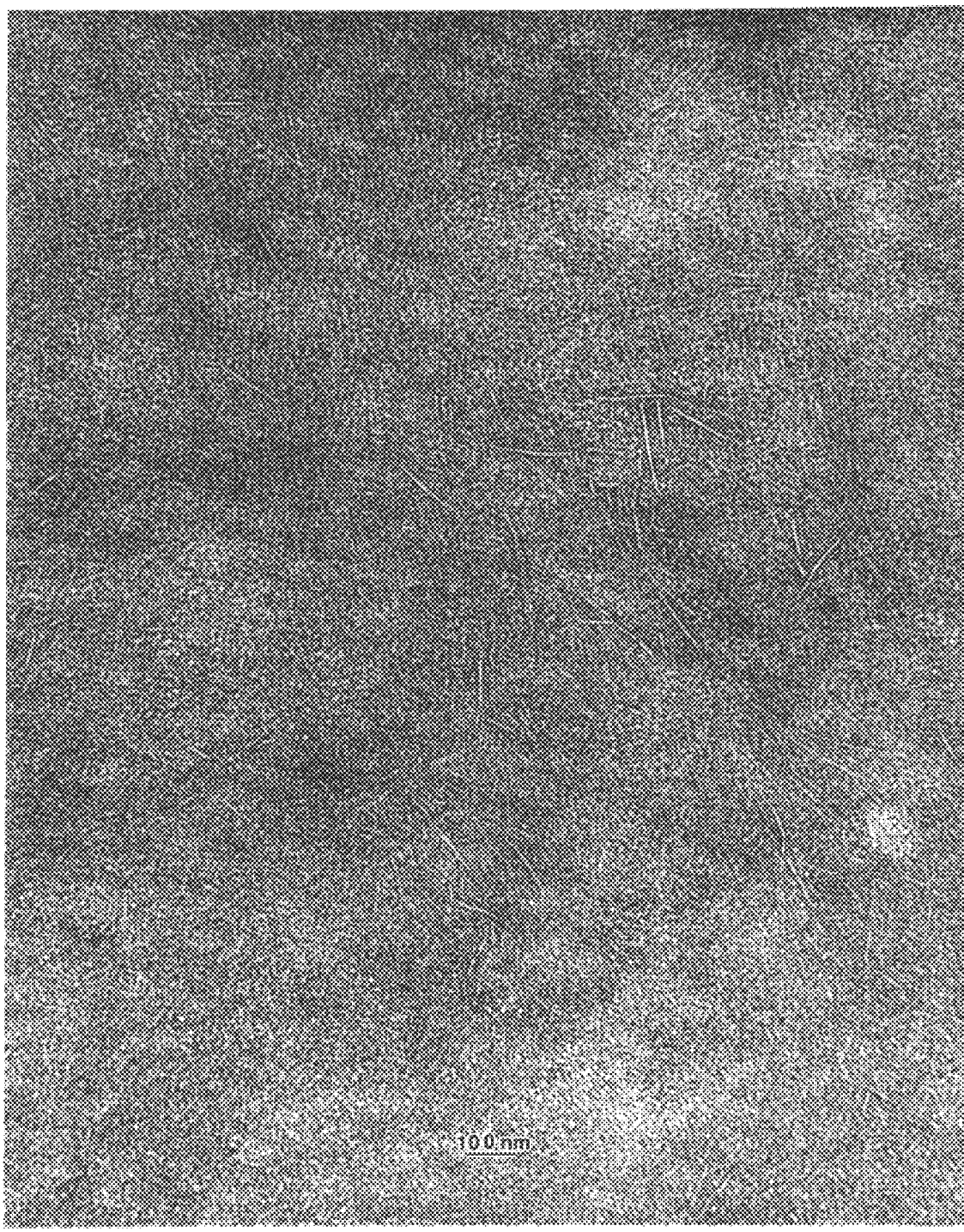
FIG. 8 is a transmission electron micrograph, at a magnification of 90,000 times, of the ultra-low molecular weight polymer of Example 13 (an ethylene/1-butene copolymer having a density of 0.868 g/cm³ and a melt viscosity at 350° F. of 5290 centipoise)
Figure 9:
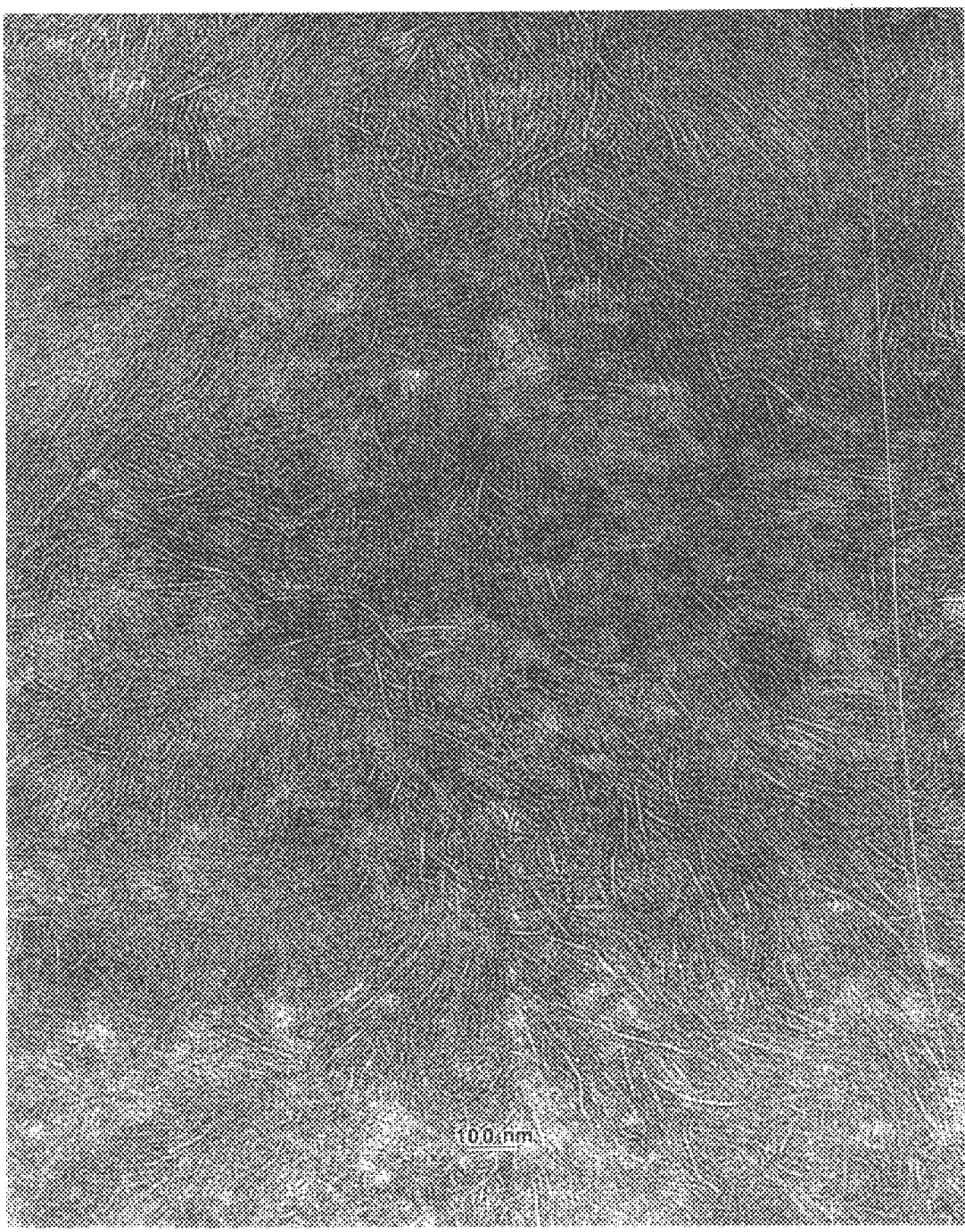
FIG. 9 is a transmission electron micrograph, at a magnification of 90,000 times, of the ultra-low molecular weight polymer of Example 14 (an ethylene/1-butene copolymer having a density of 0.887 g/cm³ and a melt viscosity at 350° F. of 5000 centipoise)

A comparison of the transmission electron micrographs of FIGS. 2(a) and 2(b), of FIGS. 3(a), 3(b), 3(c), and 3(d), and of FIGS. 7(a), 7(b), and 7(c) indicates that as the molecular weight of the polymer decreases, the number and length of the lamella increases. For instance, FIG. 2(b) shows that an ultra-low molecular weight ethylene/1-octene copolymer of the invention having a density of 0.855 g/cm$^3$ and an Mn of 4,600 has visually identifiable lamella (in contrast to the model for polymers having a density of 0.855 g/cm$^3$ set forth in FIG. 1(a). Further, while the model set forth in FIG. 1(c) would suggest that a copolymer having a density of 0.920 g/cm$^3$ would be expected to have a crystalline structure characterized by the presence of lamella and spherulites, FIG. 6 shows that an ultra-low molecular weight ethylene/1-octene polymer of the invention having a density of 0.929 g/cm$^3$ and an Mn of 8,900, has very long lamella, which is suggestive of epitaxial crystallization.

The length and population of lamella for transmission electron micrographs may be determined by digital analysis by means known in the art. Digital images of certain of the transmission electron micrographs may be acquired using a Quantimet 570 digital image analyzer (available from Leica, Inc.), through a CCD video camera. White top hat filters may be applied to the optical micrographs before detection of the binaries, i.e., with the lamella showing white against a grey background. The filters may be varied in size as required by the lamellar size in the micrographs. Detection thresholds may be set by visually comparing resulting binaries with the original images. Minimal editing of the binaries may be done to correct obvious omissions or inclusions encountered in the detection process.

Figure 3A:
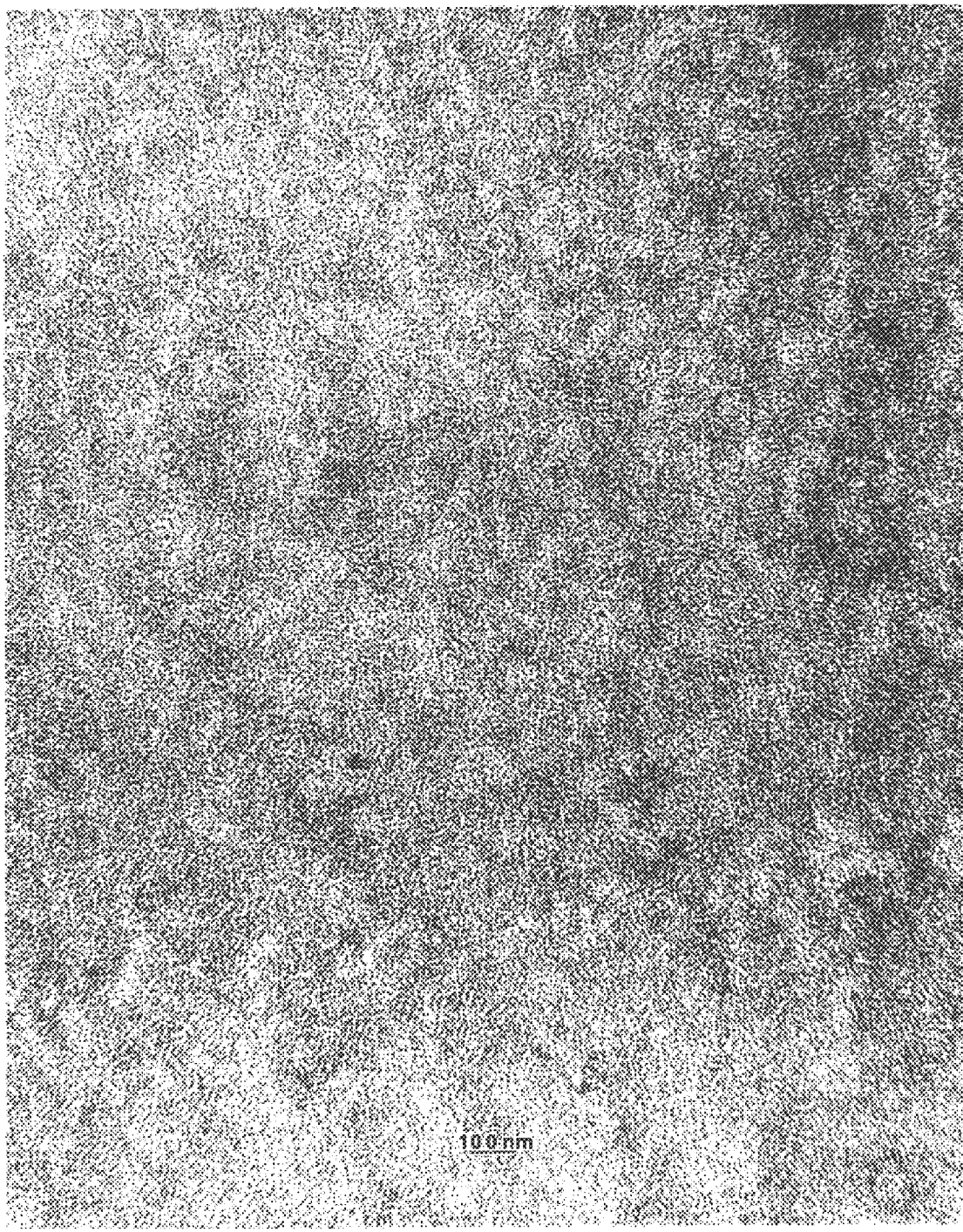
FIG. 3(a) is a transmission electron micrograph, at a magnification of 90,000 times, of the polymer of Comparative Example D (a substantially linear ethylene/1-octene copolymer having a density of 0.870 g/cm³ and an $I_2$ of 1 g/10 min)
Figure 3B:
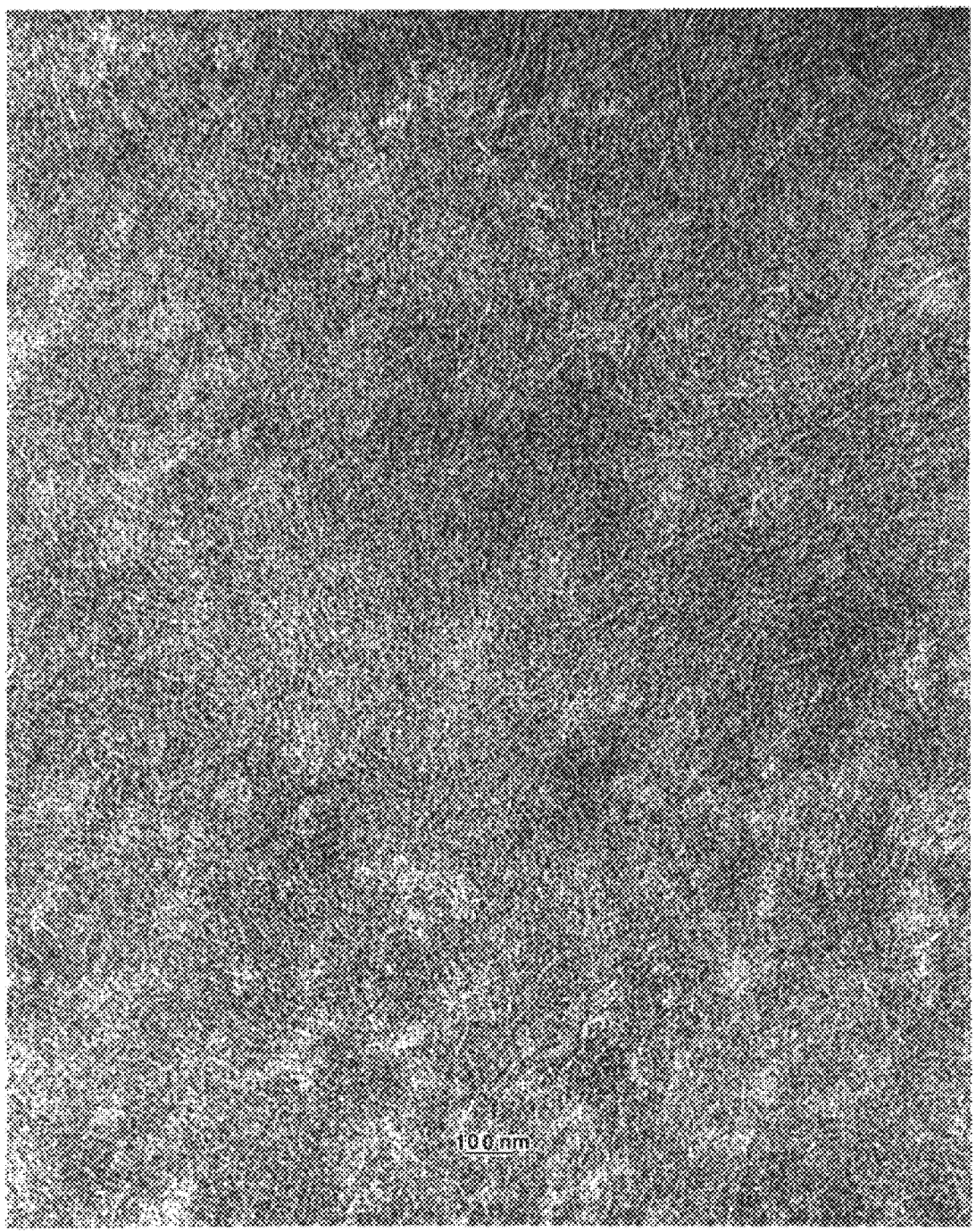
FIG. 3(b) is a transmission electron micrograph, at a magnification of 90,000 times, of the polymer of Comparative Example C2 (an ethylene/1-octene copolymer having a density of 0.875 g/cm³ and an $I_2$ of 246 g/10 min.)
Figure 3C:
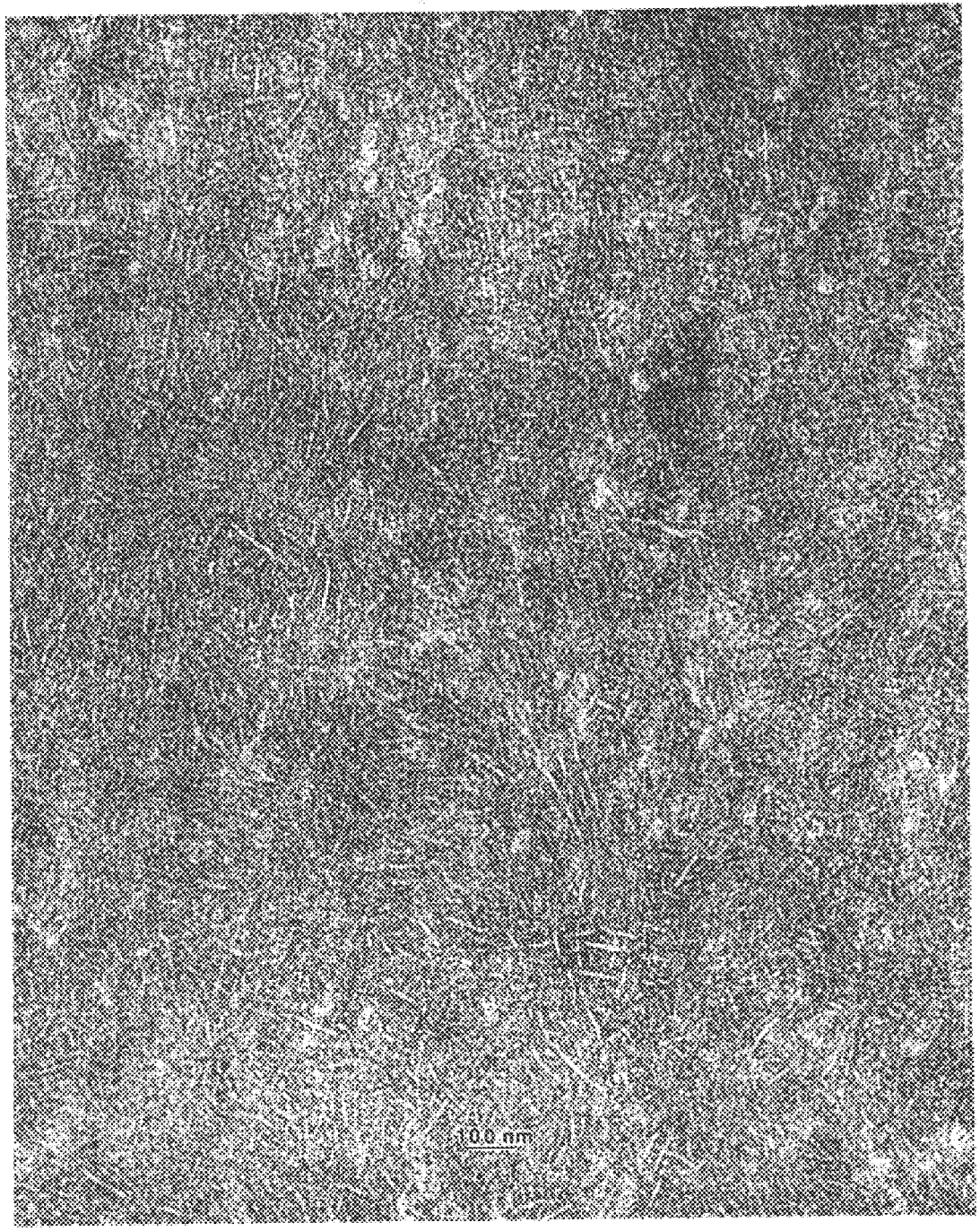
FIG. 3(c) is a transmission electron micrograph, at a magnification of 90,000 times, of the ultra-low molecular weight polymer of Example 2 (an ethylene/1-octene copolymer having a density of 0.871 g/cm³, an Mn of 9,100, and a melt viscosity at 350° F. of 4200 centipoise)
Figure 3D:
FIG. 3(d) is a transmission electron micrograph, at a magnification of 90,000 times, of the ultra-low molecular weight polymer of Example 3 (an ethylene/1-octene copolymer having a density of 0.870 g/cm³, an Mn of 4,200, and a melt viscosity at 350° F. of 355 centipoise)
Figure 4A:
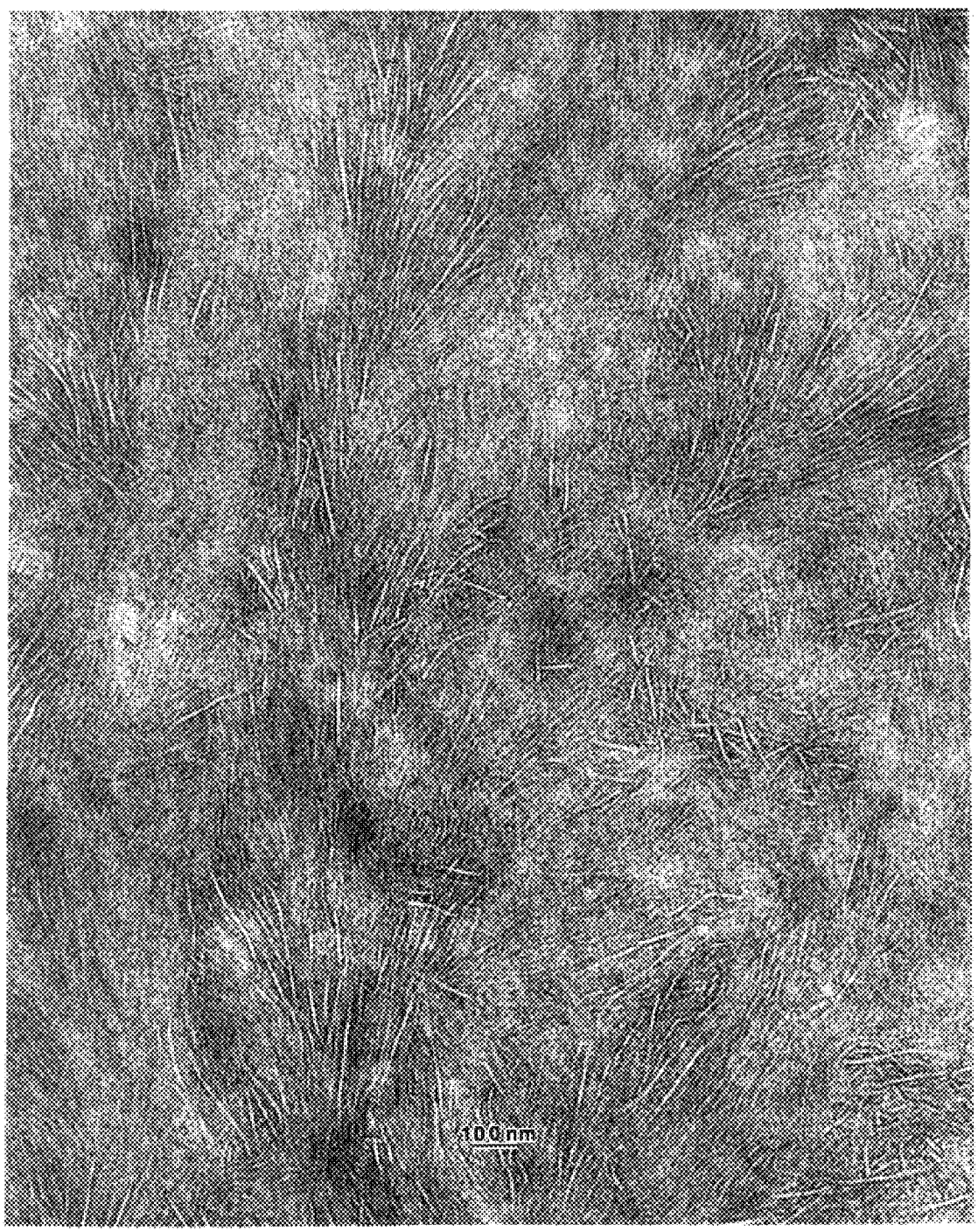
FIG. 4(a) is a transmission electron micrograph, at a magnification of 90,000 times, of the ultra-low molecular weight polymer of Example 4 (an ethylene/1-octene copolymer having a density of 0.897 g/cm³, an Mn of 8,700, and a melt viscosity at 350° F. of 5200 centipoise)
Figure 4B:
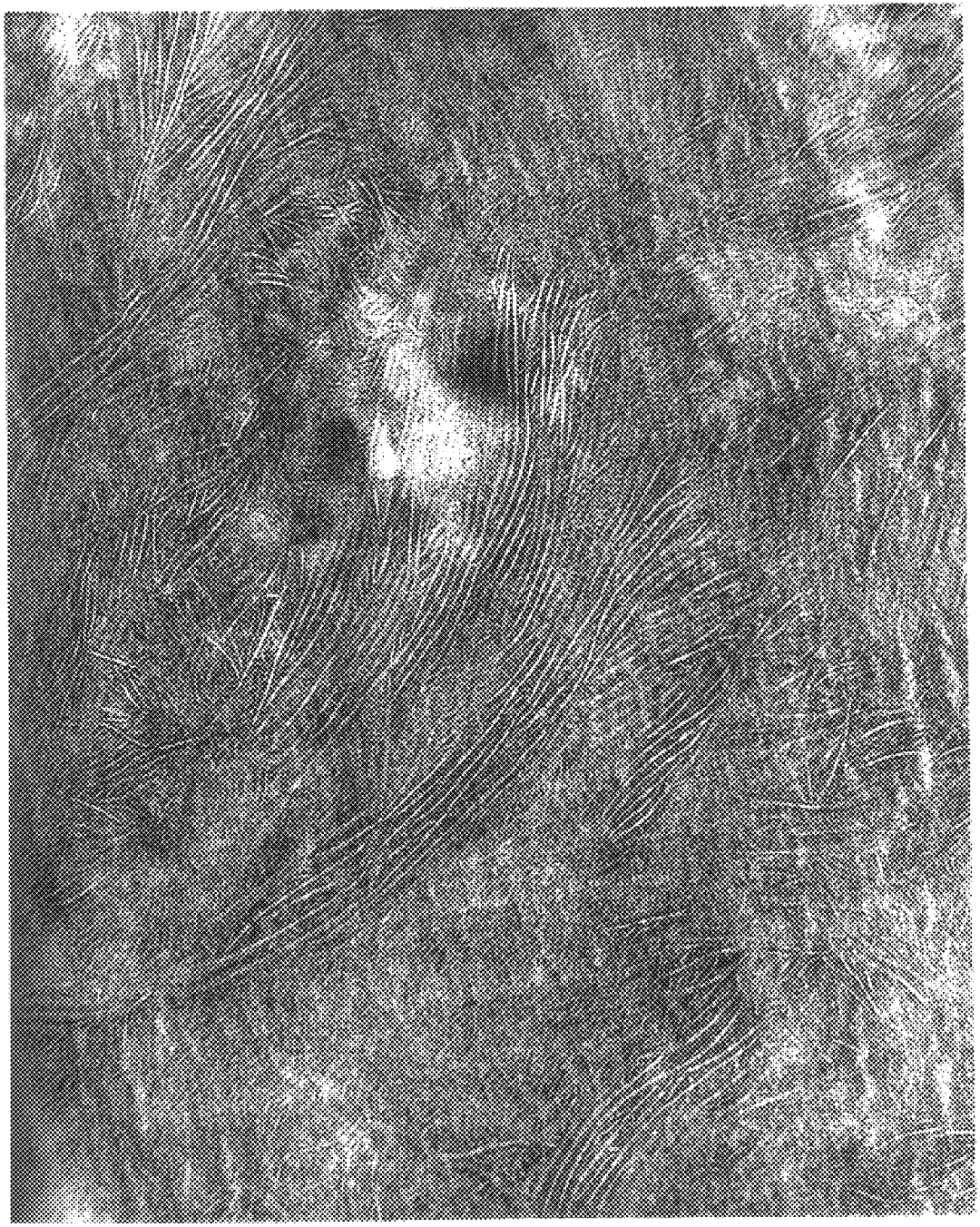
FIG. 4(b) is a transmission electron micrograph, at a magnification of 90,000 times, of the ultra-low molecular weight polymer of Example 17 (an ethylene/1-octene copolymer having a density of 0.890 g/cm³, an Mn of 4500, and a melt viscosity at 350° F. of 350 centipoise)
Figure 5:
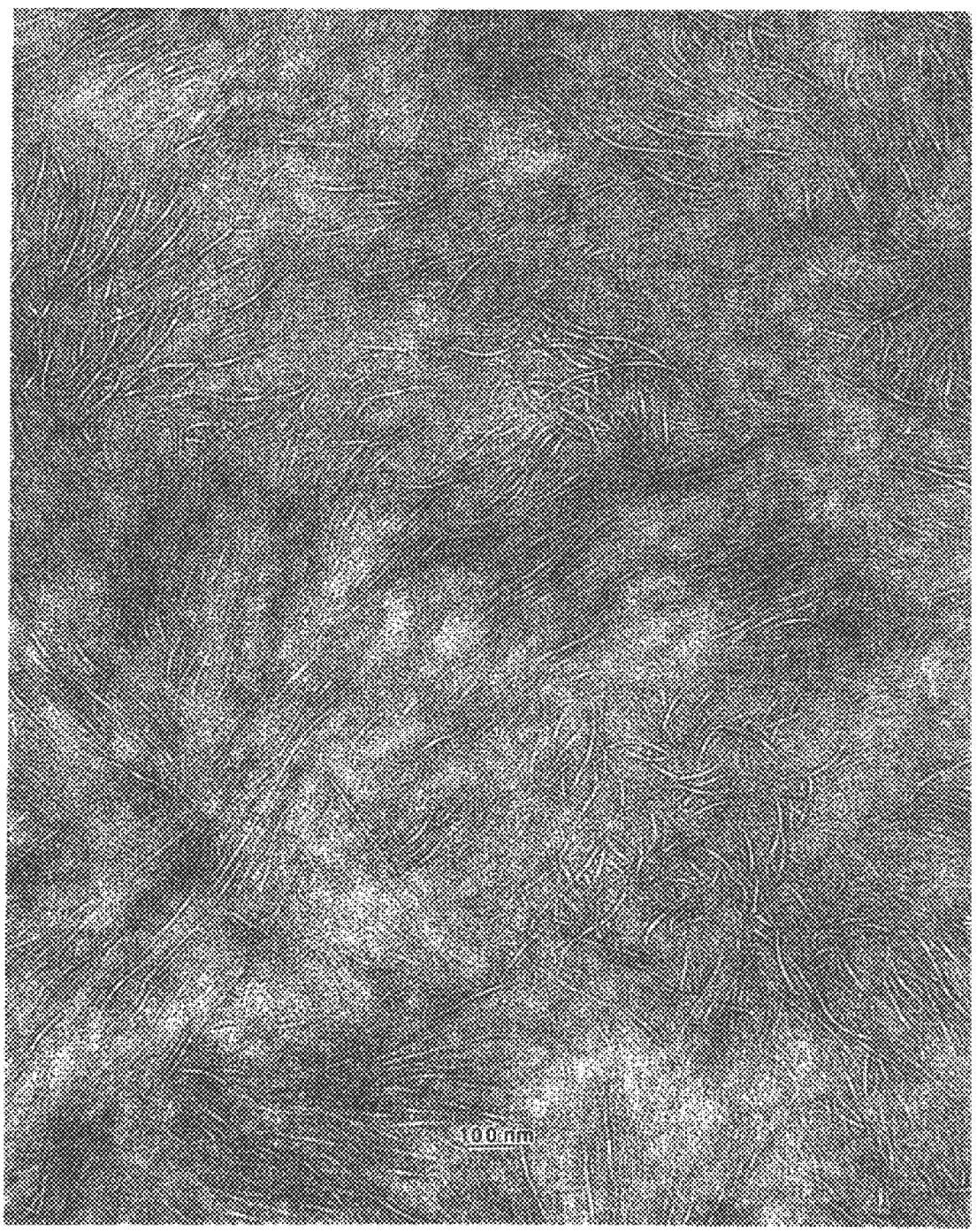
FIG. 5 is a transmission electron micrograph, at a magnification of 90,000 times, of a substantially linear ethylene/1-octene copolymer having a density of 0.915 g/cm³ and an $I_2$ of 1 g/10 min.

In the case of the ethylene/1-octene copolymers for which the transmission electron micrographs are set forth in FIGS. 3(a), 3(b), 3(c), and 3(d), the average length of the lamella detected and the number of lamella per cubic micrometer has been calculated. In the case of FIG. 3(a), the average lamellar length is 30 nanometers, with a population of 20 lamella per cubic micrometer. In the case of FIG. 3(b), the average lamellar length is 54, with a population of 140 lamella per cubic micrometer. In the case of FIG. 3(c), the average lamellar length is 59 nanometers, with a population of 240 lamella per cubic micrometer. In the case of FIG. 3(d), the average lamellar length is 66 nanometers, with a population of 381 lamella per cubic micrometer. These values indicate that ultra-low molecular weight ethylene/1-octene polymers of the invention, which have a density of about 0.870 g/cm$^3$ and Mn's of 9,100 and 4,300, respectively, have over 12 times and 40 times, respectively, as many lamella per cubic micrometer as do comparative polymers having a density of 0.870 g/cm$^3$ and an I$_2$ of 1 g/10 min.

Figure 10:
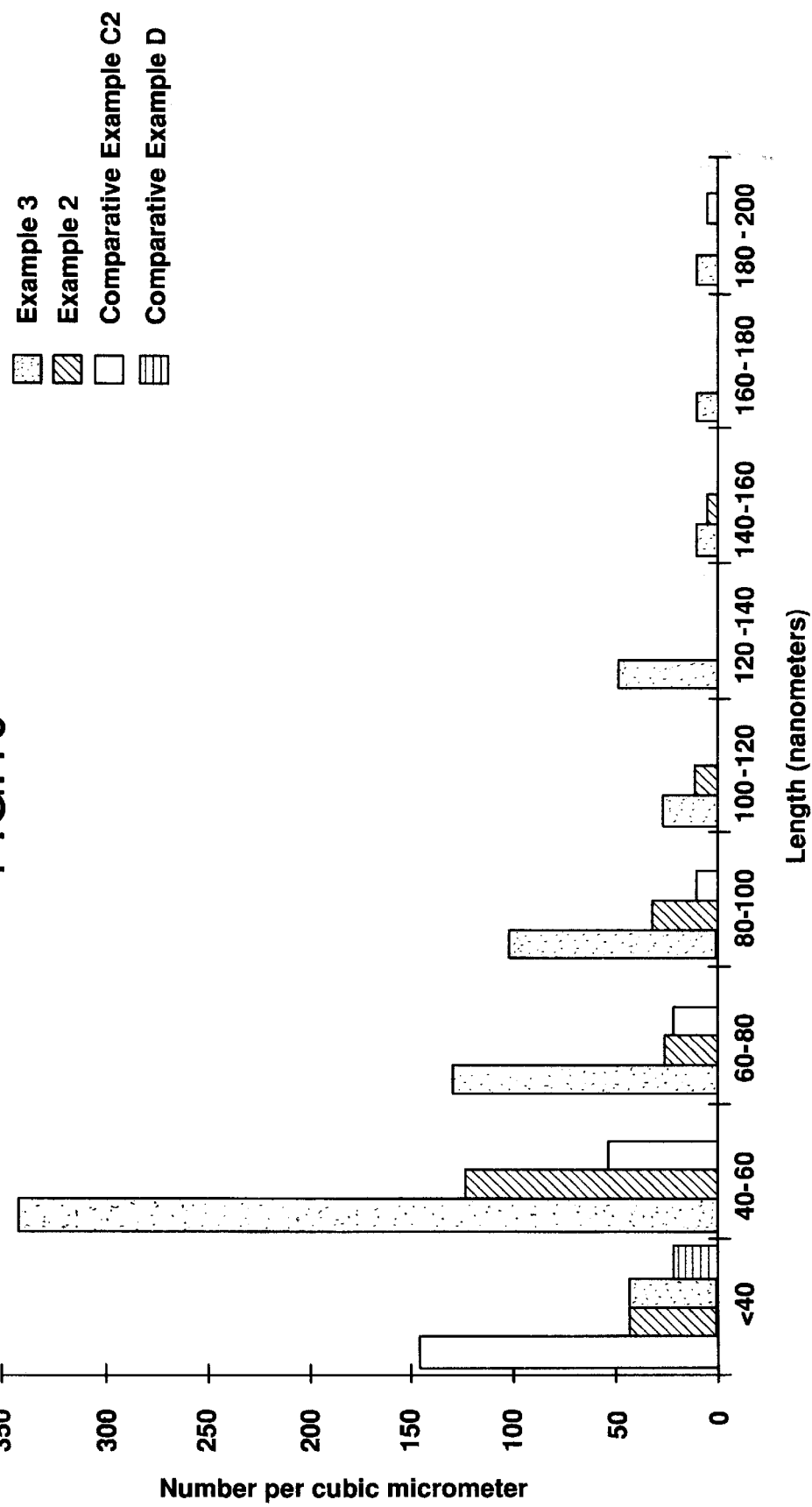
FIG. 10 is a bar chart depicting the population of lamella having lengths in the indicated ranges for the ethylene/octene copolymers for which the transmission electron micrographs are set forth in FIGS. 3(a), 3(b), 3(c), and 3(d), as determined by digital image analysis.

FIG. 10 is a bar chart depicting the population of lamella having lengths in the indicated ranges for the ethylene/octene copolymers for which the transmission electron micrographs are set forth in FIGS. 3(a), 3(b), 3(c), and 3(d), as determined by digital image analysis. Table A sets forth numerically the data used to prepare FIG. 10.

TABLE A

| | Data used in Preparation of FIG. 10 | | | |
|---|---|---|---|---|
| Lamellar length (nanometers) | No. of lamella per cubic micron FIG. 3(d) | No. of lamella per cubic micron FIG. 3(c) | No. of lamella per cubic micron FIG. 3(b) | No. of lamella per cubic micron FIG. 3(a) |
| less than 40 | 150 | 40 | 40 | 20 |
| 40–60 | 340 | 120 | 54 | 0 |
| 60–80 | 130 | 30 | 20 | 0 |
| 80–100 | 100 | 30 | 10 | 0 |
| 100–120 | 30 | 10 | 0 | 0 |
| 120–140 | 50 | 0 | 0 | 0 |
| 140–160 | 10 | 5 | 0 | 0 |

TABLE A-continued

Data used in Preparation of FIG. 10

| Lamellar length (nanometers) | No. of lamella per cubic micron FIG. 3(d) | No. of lamella per cubic micron FIG. 3(c) | No. of lamella per cubic micron FIG. 3(b) | No. of lamella per cubic micron FIG. 3(a) |
| --- | --- | --- | --- | --- |
| 160–180 | 10 | 0 | 0 | 0 |
| 180–200 | 10 | 0 | 5 | 0 |

As shown in FIG. 10 and Table A, ethylene/1-octene copolymers having a density of 0.870 g/cm$^3$ and an I$_2$ of 1 g/10 min., while they have some images with an aspect ratio greater than 3 (they have 20 lamella per cubic micron having a length less than 40 nanometers), they do not have any lamella greater than 40 nanometers in length. As also shown, ethylene/1-octene copolymers having a density of 0.875 g/cm$^3$ and an I$_2$ of 246 g/10 min. have twice as many lamella less than 40 nanometers in length than copolymers having an I$_2$ of 1 g/10 min., and exhibit lamella in the ranges of 40–60, 60–80, and 80–100 nanometers in length (with no significant number of lamella having a length greater than 100 nanometers). As also shown, ethylene/1-octene copolymers having a density of 0.871 g/cm$^3$ and an Mn of 9,100, have 2.2 times as many lamella having a length from 40–60 nanometers and 3 times as many lamella having a length of from 80 to 100 nanometers than ethylene/octene copolymers having a density of 0.875 g/cm$^3$ and an I$_2$ of 246 g/10 min. As also shown, ethylene/1-octene copolymers having a density of 0.870 g/cm$^3$ and an Mn of 4,300, have over 6 times as many lamella having a length from 40–60 nanometers, 6 times as many lamella having a length from 60–80 nanometers, and 9.5 times as many lamella having a length of from 80 to 100 nanometers than ethylene/1-octene copolymers having a density of 0.875 g/cm$^3$ and an I$_2$ of 246 g/10 min. Moreover, the ethylene/octene copolymers having a density of 0.870 g/cm$^3$ and an Mn of 4,300, have significant numbers of lamella in the ranges of 100–120 and 120–140 nanometers.

Figure 11:
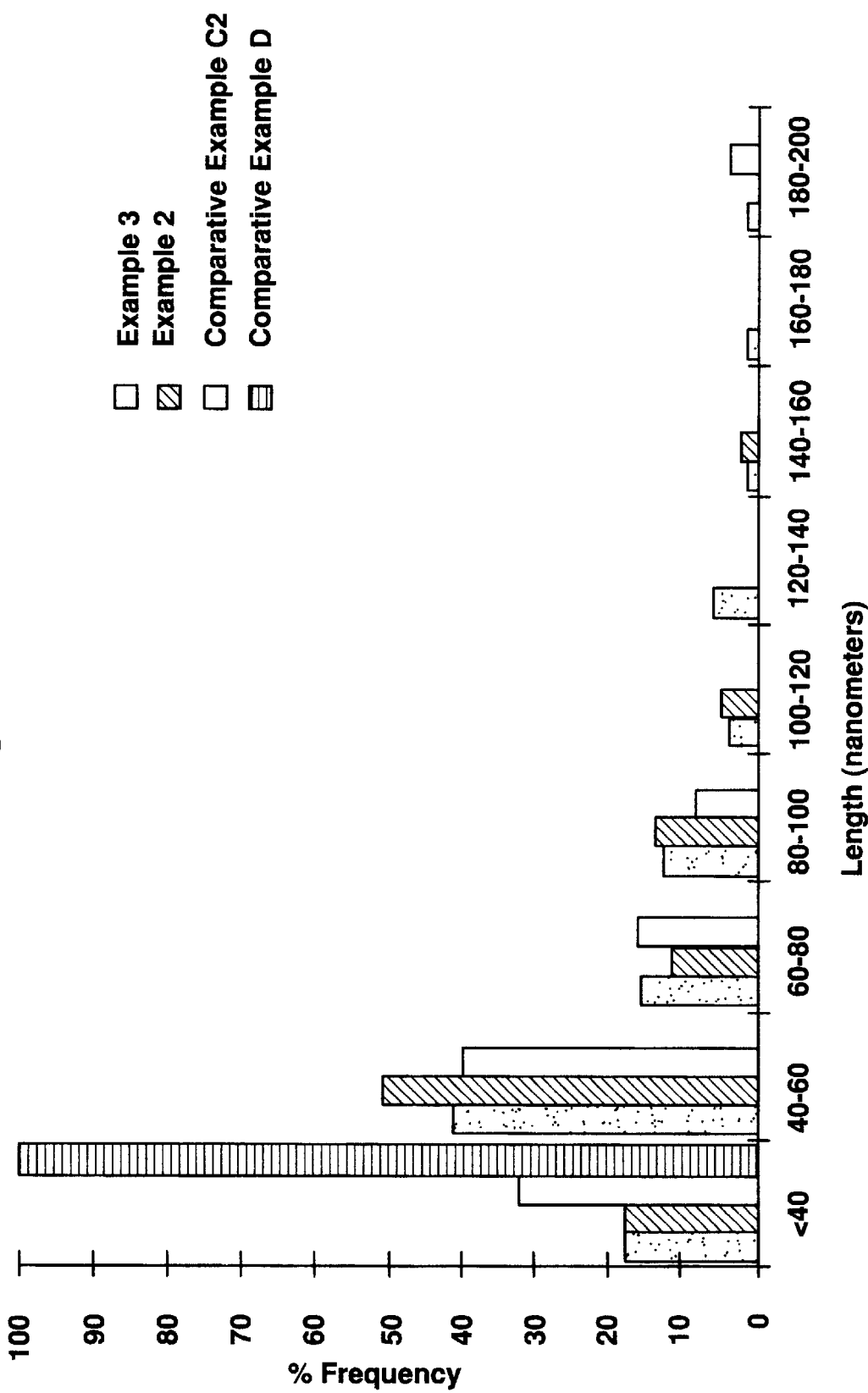
FIG. 11 is a bar chart depicting the frequency of lamella having lengths in the indicated ranges for the ethylene/1-octene copolymers for which the transmission electron micrographs are set forth in FIGS. 3(a), 3(b), 3(c), and 3(d), i.e., the percentage of total lamella which have lengths in the indicated ranges, as determined by digital image analysis.

FIG. 11 is a bar chart depicting the frequency of lamella having lengths in the indicated ranges for the ethylene/1-octene copolymers for which the transmission electron micrographs are set forth in FIGS. 3(a), 3(b), 3(c), and 3(d), i.e., the percentage of the total number of lamella which have lengths in the indicated ranges, as determined by digital image analysis. Table B sets forth numerically the data used to prepare FIG. 11.

TABLE B

Data used in Preparation of FIG. 11

| Lamellar length (nanometers) | Percent of lamella having length in indicated range FIG. 3(d) | Percent of lamella having length in indicated range FIG. 3(c) | Percent of lamella having length in indicated range FIG. 3(b) | Percent of lamella having length in indicated range FIG. 3(a) |
| --- | --- | --- | --- | --- |
| less than 40 | 18 | 20 | 30 | 100 |
| 40–60 | 41 | 51 | 40 | 0 |
| 60–80 | 16 | 10 | 20 | 0 |
| 80–100 | 12 | 10 | 8 | 0 |
| 100–120 | 3 | 4 | 0 | 0 |
| 120–140 | 6 | 0 | 0 | 0 |
| 140–160 | 1 | 2 | 0 | 0 |

TABLE B-continued

Data used in Preparation of FIG. 11

| Lamellar length (nanometers) | Percent of lamella having length in indicated range FIG. 3(d) | Percent of lamella having length in indicated range FIG. 3(c) | Percent of lamella having length in indicated range FIG. 3(b) | Percent of lamella having length in indicated range FIG. 3(a) |
| --- | --- | --- | --- | --- |
| 160–180 | 1 | 0 | 0 | 0 |
| 180–200 | 1 | 0 | 4 | 0 |

More specifically, FIG. 11 shows that for an ultra-low density ethylene/1-octene copolymer of the invention which has a density of 0.871 g/cm$^3$ and an Mn of 9,100, 80 percent of the lamella have a length greater than 40 nanometers, with 50 percent of the lamella having a length between 40 and 60 nanometers, over 10 percent of the lamella having a length between 60 and 80 nanometers, and over 10 percent of the lamella having a length between 80 and 100 nanometers. Further, FIG. 11 shows that for an ultra-low density ethylene/1-octene copolymer of the invention which has a density of 0.870 g/cm$^3$ and an Mn of 4,300, over 80 percent of the lamella have a length greater than 40 nanometers, with over 40 percent of the lamella having a length of from 40 to 60 nanometers, 16 percent of the lamella having a length of from 60 to 80 nanometers, 12 percent of the lamella having a length of from 80 to 100 nanometers, and over 10 percent of the lamella having a length greater than 100 nanometers.

At higher densities, the ultra-low molecular weight ethylene polymers of the invention likewise exhibit a crystalline structure which is markedly different from that of higher molecular weight comparative materials. For instance, FIG. 5 reveals that while an ethylene/octene copolymer having a density of 0.915 g/cm$^3$ and an I$_2$ of 1 g/10 min. has lamella, some of which appear entangled, i.e., a crystalline organization which corresponds to the Type III structure set forth in FIG. 1(c). In contrast, FIG. 6 reveals that an ethylene/octene copolymer having a density of 0.929 g/cm$^3$ and an Mn of 8,900, is characterized by long lamella indicative of epitaxial crystallization. The contrast between ultra-low molecular weight materials and high molecular weight materials, at higher polymer densities, is especially striking in FIGS. 7(a), 7(b), and 7(c).

Figure 12:
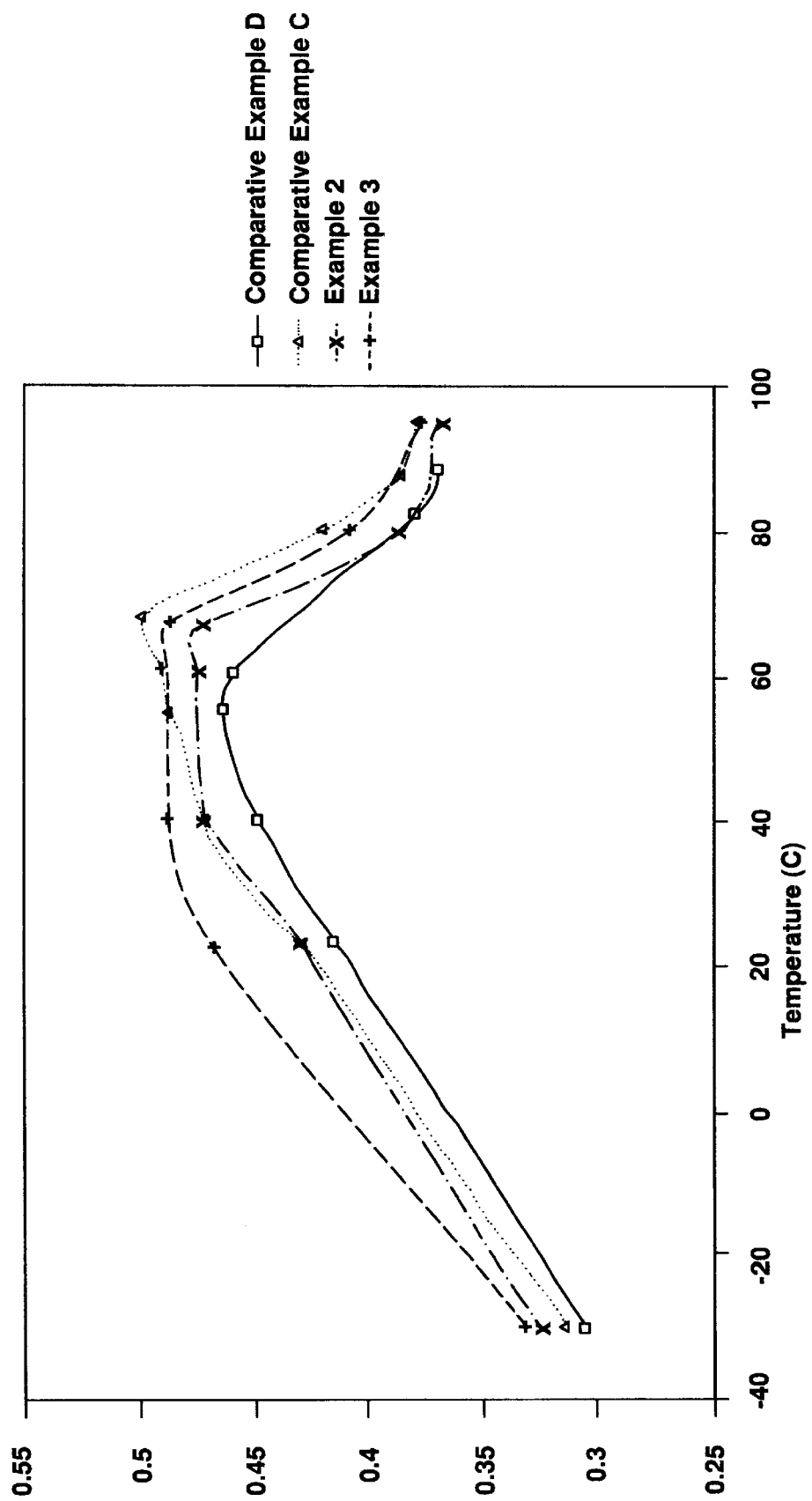
FIG. 12 is a compilation of the melting curves, as determined by differential scanning calorimetry, for the ethylene/1-octene copolymers for which the transmission electron micrographs are set forth in FIGS. 3(a), 3(b), 3(c), and 3(d)
Figure 13:
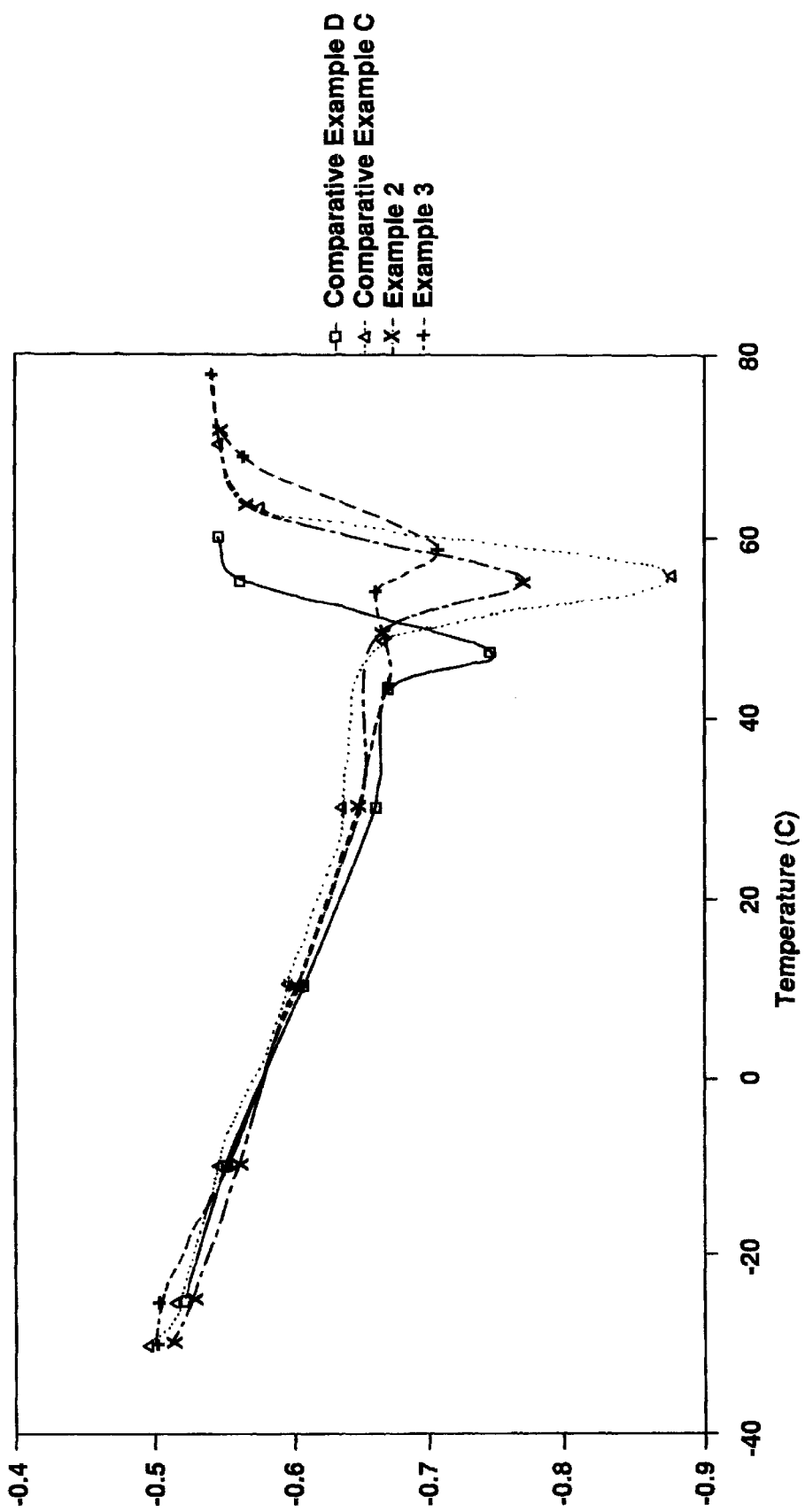
FIG. 13 is a compilation of the crystallization curves, as determined by differential scanning calorimetry, for the ethylene/1-octene copolymers for which the transmission electron micrographs are set forth in FIGS. 3(a), 3(b), 3(c), and 3(d)
Figure 14:
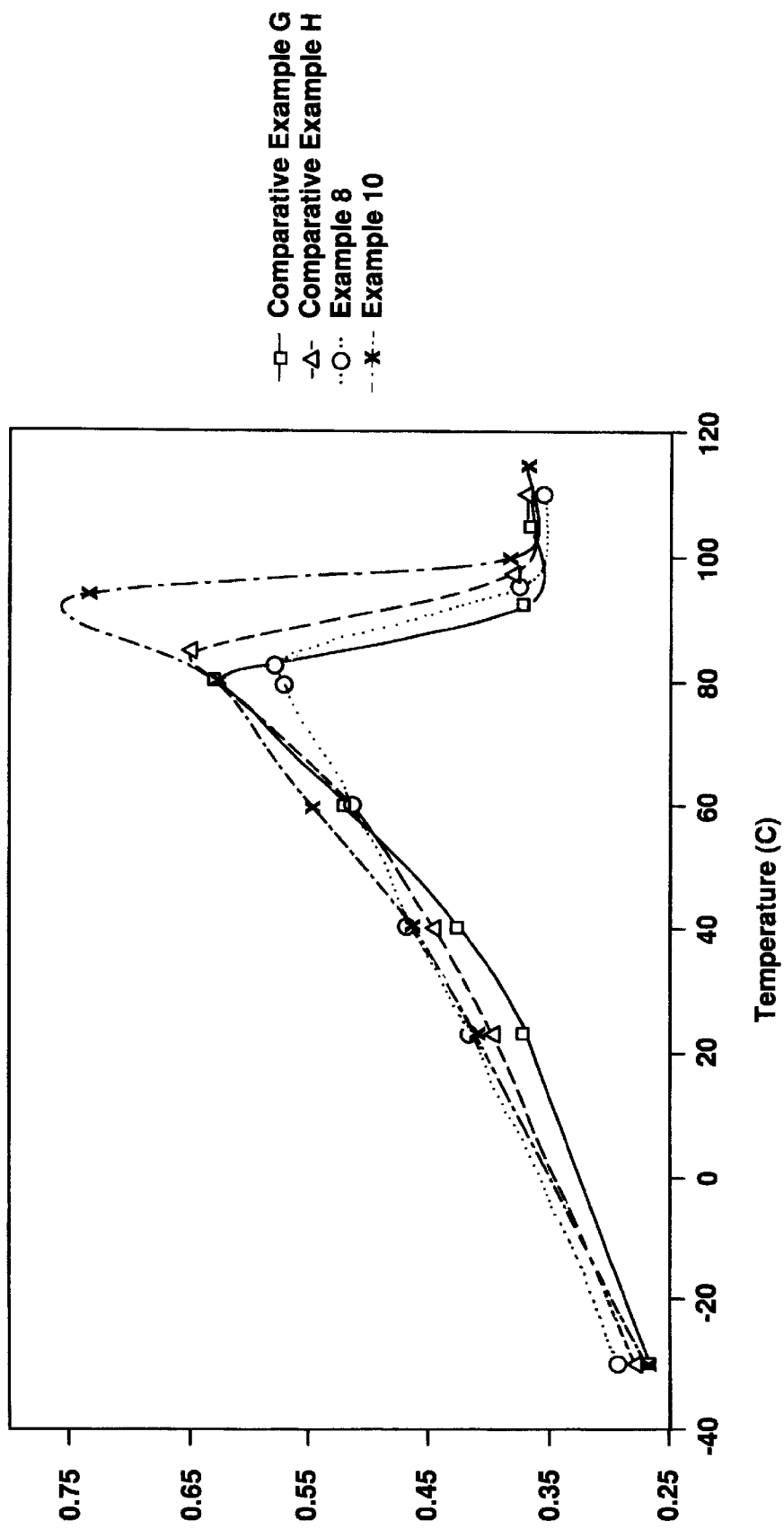
FIG. 14 is a compilation of the melting curves, as determined by differential scanning calorimetry, for the ethylene/1-octene copolymers of Comparative Examples G and H and of Examples 8 and 10.
Figure 15:
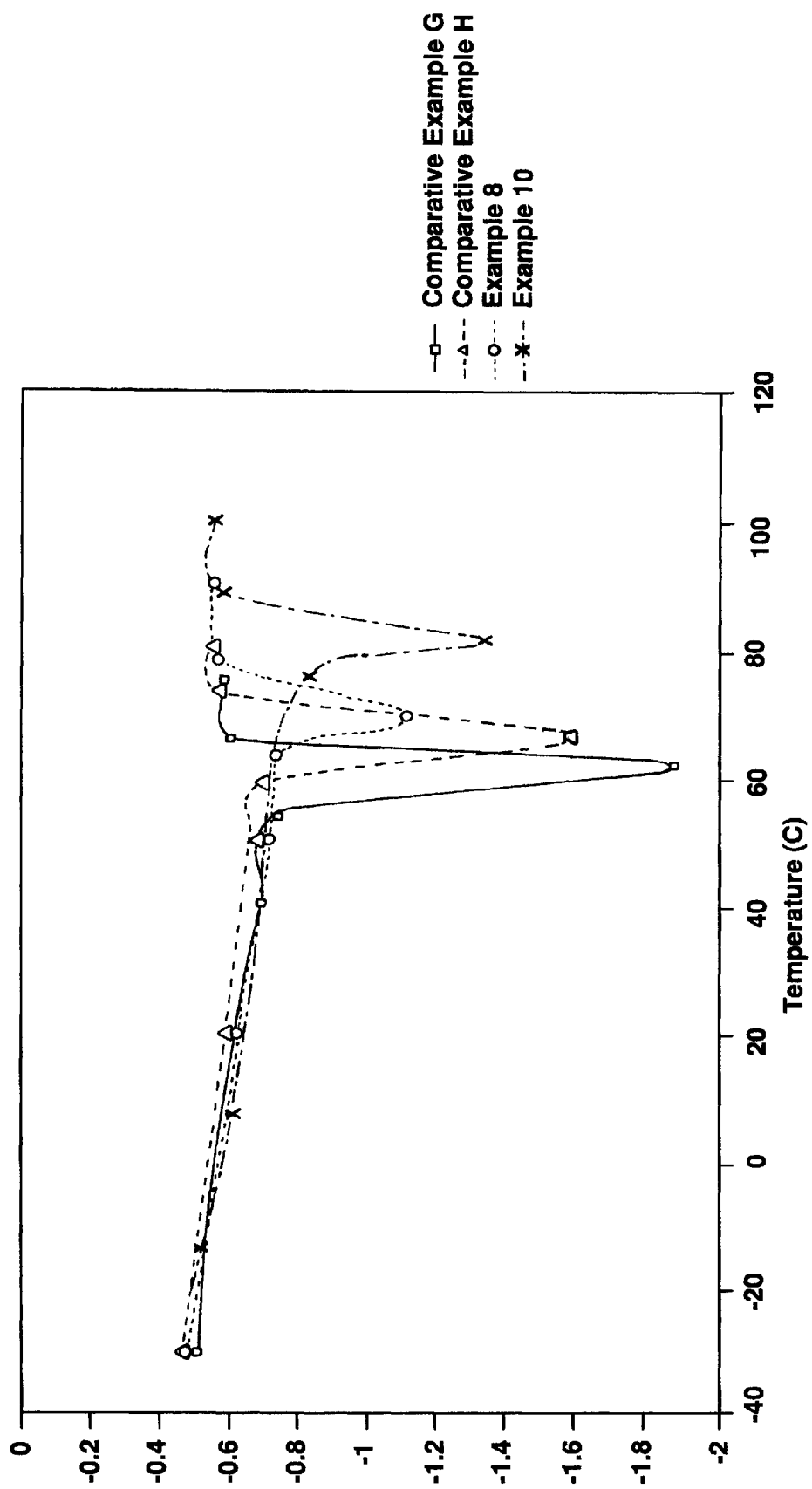
FIG. 15 is a compilation of the crystallization curves obtained by differential scanning calorimetry for the ethylene/1-octene copolymers of Comparative Examples G and H and of Examples 8 and 10.

The greater proportion of more highly crystalline materials (and greater proportion of more highly amorphous materials) characteristic of the ultra-low molecular weight ethylene polymers of the invention are reflected in the physical properties of the polymer, such as the melting and crystallization behavior. FIG. 12 is a compilation of the melting curves obtained by differential scanning calorimetry for the ethylene/1-octene copolymers for which the transmission electron micrographs are set forth in FIGS. 3(a), 3(b), 3(c), and 3(d). FIG. 13 is a compilation of the crystallization curves obtained by differential scanning calorimetry for the ethylene/1-octene copolymers for which the transmission electron micrographs are set forth in FIGS. 3(a), 3(b), 3(c), and 3(d). FIG. 14 is a compilation of the melting curves obtained by differential scanning calorimetry for the ethylene/1-octene copolymers of Comparative Examples G and H and of Examples 8 and 10. FIG. 15 is a compilation of the crystallization curves obtained by differential scanning calorimetry for the ethylene/1-octene copolymers of Comparative Examples G and H and of Examples 8 and 10.

As illustrated in FIGS. 12 and 14, as the molecular weight of the copolymer decreases, the melting behavior broadens and the peak melting temperature shifts to the right. As illustrated in FIGS. 13 and 15, as the molecular weight of the copolymer decreases, the crystalline melting point likewise shifts to the right. FIGS. 12 through 15 support the conclusion that the lower molecular weight of the invention have greater proportions of more highly crystalline materials (and greater portions of more highly amorphous materials) than their higher molecular weight counterparts. This suggests that the ultra-low molecular weight materials of the invention will begin to crystallize at higher temperatures than corresponding higher molecular weight materials having an equivalent density. This leads to utility in applications where the polymer or formulation must solidify quickly (such as in hot melt adhesives) or must maintain its structural integrity upon application of heat (such as in shoe soles which are intended for consumer machine washing and drying at elevated temperatures).

Figure 16:
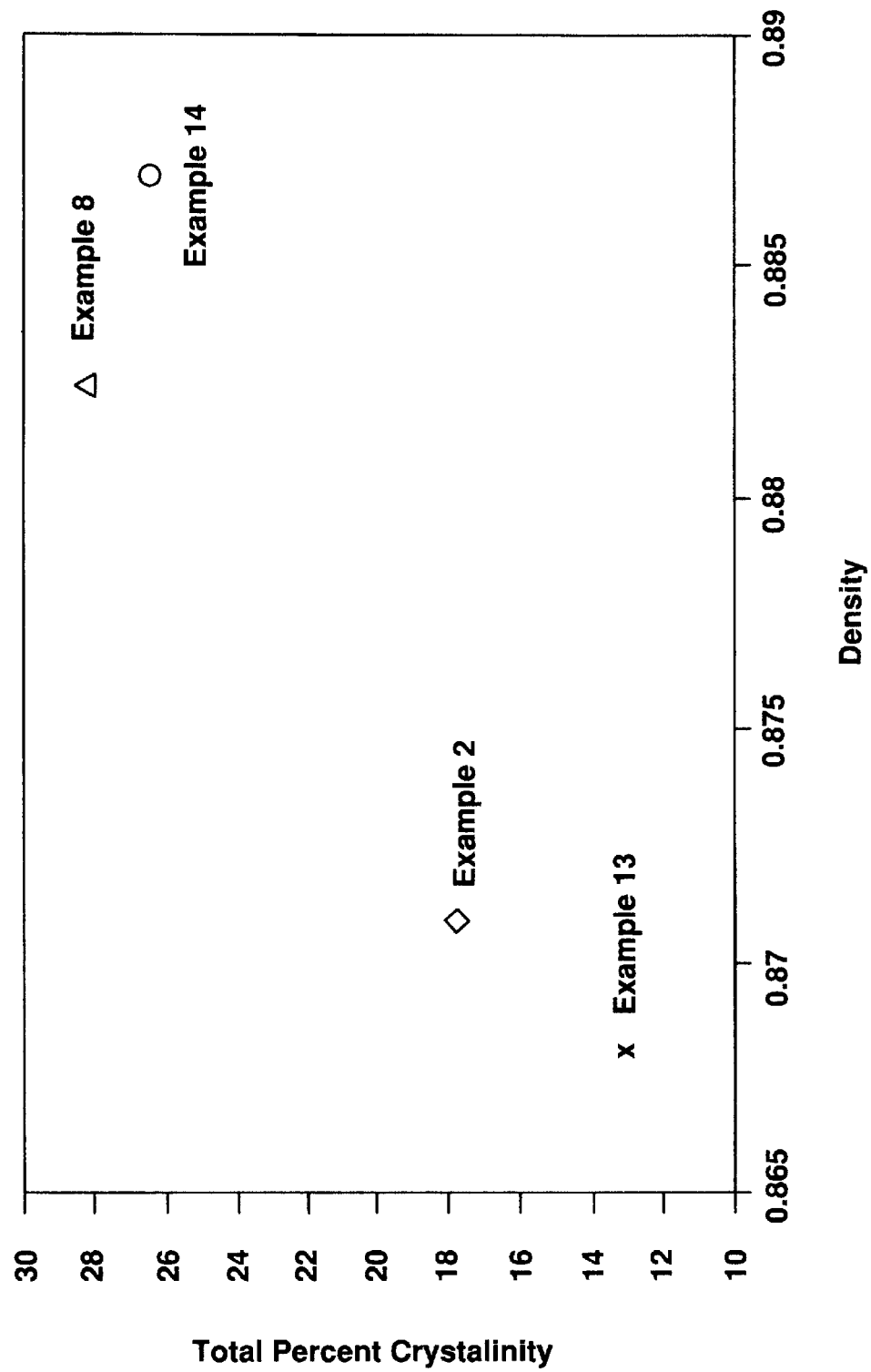
FIG. 16 is a plot of the total percent crystallinity of ethylene/1-octene and ethylene/1-butene copolymers of the invention versus the density of such copolymers.
Figure 17:
FIG. 17 is a transmission electron micrograph, at a magnification of 90,000 times, of the ultra-low molecular weight polymer of Example 19 (an ethylene/1-octene copolymer having a density of 0.920 g/cm³, an Mn of 9800, and a melt viscosity at 350° F. of 5620 centipoise.

Likewise, the selection of comonomer affects the high temperature performance of the ultra-low molecular weight polymers of the invention. In particular, as the length of the comonomer chain increases, the percent crystallinity as determined by DSC likewise increases when density and melt index are held constant. For instance, FIG. 16 shows that an ethylene/1-octene polymer of the invention having a density of 0.883 g/cm$^3$ and a melt viscosity at 350° F. of 5000 centipoise (Mn of 8,200) has a greater total percent crystallinity than an ethylene/1-butene copolymer of the invention having a density of 0.887 g/cm$^3$ and a melt viscosity at 350° F. of 5000 centipoise, e.g., 28.18 versus 26.39 percent. Accordingly, when an α-olefin comonomer is employed, such comonomer will preferably be a $C_4$–$C_{20}$ α-olefin, more preferably a $C_5$–$C_{20}$ α-olefin, and most preferably a $C_6$–$C_{20}$ α-olefin.

The ultra-low molecular weight ethylene polymers of the invention are characterized as being non-pourable. That is, the ultra-low molecular weight ethylene polymers of the invention are characterized as having a pour point greater than −30° C. as determined by ASTM D-97. Preferably, the pour point of the ultra-low molecular weight ethylene polymers will be greater than room temperature (25° C.), and more preferably greater than 50° C.

The ultra-low molecular weight ethylene polymers of the invention may be ethylene homopolymers or interpolymers of ethylene and at least one suitable comonomer. Preferred comonomers include $C_{3-20}$ α-olefins (especially ethylene, propylene, isobutylene, 1-butene, 1-hexene, 3-methyl-1-pentene, 4-methyl-1-pentene, 1-hexene, and 1-octene), $C_{4-40}$ non-conjugated dienes, styrene, alkyl-substituted styrene, tetrafluoroethylene, naphthenics, and mixtures thereof.

When ethylene propylene diene terpolymers (EPDM's) are prepared, the dienes are typically non-conjugated dienes having from 6 to 15 carbon atoms. Representative examples of suitable non-conjugated dienes that may be used to prepare the terpolymers include:
(a) Straight chain acyclic dienes such as 1,4-hexadiene; 1,5-heptadiene; and 1,6-octadiene;
(b) Branched chain acyclic dienes such as 5-methyl-1,4-hexadiene; 3,7-dimethyl-1,6-octadiene; and 3,7-dimethyl-1,7-octadiene;
(c) Single ring alicyclic dienes such as 4-vinylcyclohexene; 1-allyl-4-isopropylidene cyclohexane; 3-allylcyclopentene; 4-allylcyclohexene; and 1-isopropenyl-4-butenylcyclohexene;
(d) Multi-ring alicyclic fused and bridged ring dienes such as dicyclopentadiene; alkenyl, alkylidene, cycloalkenyl, and cycloalkylidene norbornenes, such as 5-methylene-2-norbornene; 5-methylene-6-methyl-2-norbornene; 5-methylene-6,6-dimethyl-2-norbornene; 5-propenyl-2-norbornene; 5-(3-cyclopentenyl)-2-norbornene; 5-ethylidene-2-norbornene; 5-cyclohexylidene-2-norbornene; etc.

The preferred dienes are selected from the group consisting of 1,4-hexadiene; dicyclopentadiene; 5-ethylidene-2-norbornene; 5-methylene-2-norbornene; 7-methyl-1,6 octadiene; 4-vinylcyclohexene; etc. One preferred conjugated diene which may be employed is piperylene.

Most preferred monomers are ethylene, mixtures of ethylene, propylene and ethylidenenorbornene, or mixtures of ethylene and a $C_{4-8}$ α-olefin, more especially a $C_6$–$C_8$, and most especially 1-octene.

The ultra-low molecular weight ethylene polymers of the invention may be prepared using a constrained geometry catalyst. Constrained geometry metal complexes and methods for their preparation are disclosed in U.S. application Ser. No. 545,403, filed Jul. 3, 1990 (EP-A-416,815); U.S. application Ser. No. 702,475, filed May 20, 1991, ABN (EP-A-514,828); as well as U.S. Pat. Nos. 5,470,993, 5,374,696, 5,231,106, 5,055,438, 5,057,475, 5,096,867, 5,064,802, and 5,132,380. In U.S. Ser. No. 720,041, filed Jun. 24, 1991, ABN (EP-A-514,828) certain borane derivatives of the foregoing constrained geometry catalysts are disclosed and a method for their preparation taught and claimed. In U.S. Pat. No. 5,453,410 combinations of cationic constrained geometry catalysts with an alumoxane were disclosed as suitable olefin polymerization catalysts. For the teachings contained therein, the aforementioned pending United States Patent applications, issued United States Patents and published European Patent Applications are herein incorporated in their entirety by reference thereto.

Exemplary constrained geometry metal complexes in which titanium is present in the +4 oxidation state include but are not limited to the following: (n-butylamido)dimethyl ($\eta^5$-tetramethylcyclopentadienyl)silanetitanium (IV) dimethyl; (n-butylamido)dimethyl($\eta^5$-tetramethylcyclopentadienyl)silanetitanium (IV) dibenzyl; (t-butylamido)dimethyl($\eta^5$-tetramethylcyclopentadienyl) silanetitanium (IV) dimethyl; (t-butylamido)dimethyl($\eta^5$-tetramethylcyclopentadienyl)silanetitanium (IV) dibenzyl; (cyclododecylamido)dimethyl($\eta^5$-tetramethylcyclopentadienyl)silanetitanium (IV) dibenzyl; (2,4,6-trimethylanilido)dimethyl-($\eta^5$tetramethylcyclopentadienyl)silanetitanium (IV) dibenzyl; (1-adamantylamido)dimethyl($\eta^5$-tetramethylcyclopentadienyl)silanetitanium (IV) dibenzyl; (t-butylamido)dimethyl($\eta^5$-tetramethylcyclopentadienyl) silanetitanium (IV) dimethyl; (t-butylamido)dimethyl($\eta^5$-tetramethylcyclopentadienyl)silanetitanium (IV) dibenzyl; (1-adamantylamido)dimethyl($\eta^5$-tetramethylcyclopentadienyl)silanetitanium (IV) dimethyl; (n-butylamido)diisopropoxy($\eta^5$-tetramethylcyclopentadienyl)silanetitanium (IV) dimethyl; (n-butylamido)diisopropoxy($\eta^5$-tetramethylcyclopentadienyl)silanetitanium (IV) dibenzyl; (cyclododecylamido)diisopropoxy($\eta^5$-tetramethylcyclopentadienyl)-silanetitanium (IV) dimethyl; (cyclododecylamido)diisopropoxy($\eta^5$-tetramethylcyclopentadienyl)-silanetitanium (IV) dibenzyl; (2,4,6-trimethylanilido)diisopropoxy($\eta^5$-tetramethylcyclopentadienyl)silanetitanium (IV) dimethyl; (2,4,6-trimethylanilido)diisopropoxy($\eta^5$-tetramethylcyclopentadienyl)silanetitanium (IV) dibenzyl; (cyclododecylamido)dimethoxy($\eta^5$-tetramethylcyclopentadienyl)silanetitanium (IV) dimethyl; (cyclododecylamido)dimethoxy($\eta^5$- tetramethylcyclopentadienyl)silanetitanium (IV) dibenzyl; (1-adamantylamido)diisopropoxy($\eta^5$-tetramethylcyclopentadienyl)silanetitanium (IV) dimethyl; (1-adamantylamido)diisopropoxy($\eta^5$-tetramethylcyclopentadienyl)silanetitanium (IV) dibenzyl; (n-butylamido)dimethoxy($\eta^5$-tetramethylcyclopentadienyl)silanetitanium (IV) dimethyl; (n-butylamido)dimethoxy($\eta^5$-tetramethylcyclopentadienyl)silanetitanium (IV) dibenzyl; (2,4,6-trimethylanilido)dimethoxy($\eta^5$-tetramethylcyclopentadienyl)silanetitanium (IV) dimethyl; (2,4,6-trimethylanilido)dimethoxy($\eta^5$-tetramethylcyclopentadienyl)silanetitanium (IV) dibenzyl; (1-adamantylamido)dimethoxy($\eta^5$-tetramethylcyclopentadienyl)silanetitanium (IV) dimethyl; (1-adamantylamido)dimethoxy($\eta^5$-tetramethylcyclopentadienyl)silanetitanium (IV) dibenzyl; (n-butylamido)ethoxymethyl($\eta^5$-tetramethylcyclopentadienyl)silanetitanium (IV) dimethyl; (n-butylamido)ethoxymethyl($\eta^5$-tetramethylcyclopentadienyl)silanetitanium (IV) dibenzyl; (cyclododecylamido)ethoxymethyl($\eta^5$-tetramethylcyclopentadienyl)silanetitanium (IV) dimethyl; (cyclododecylamido)ethoxymethyl($\eta^5$-tetramethylcyclopentadienyl)silanetitanium (IV) dibenzyl; (2,4,6-trimethylanilido)ethoxymethyl($\eta^5$-tetramethylcyclopentadienyl)silanetitanium (IV) dimethyl; (2,4,6-trimethylanilido)ethoxymethyl($\eta^5$-tetramethylcyclopentadienyl)silanetitanium (IV) dibenzyl; (cyclododecylamido)dimethyl($\eta^5$-tetramethylcyclopentadienyl)silanetitanium (IV) dimethyl; (1-adamantylamido)-ethoxymethyl($\eta^5$-tetramethylcyclopentadienyl)silanetitanium (IV) dimethyl; and (1-adamantylamido)ethoxymethyl($\eta^5$-tetramethylcyclopentadienyl)silanetitanium (IV) dibenzyl.

Exemplary constrained geometry metal complexes in which titanium is present in the +3 oxidation state include but are not limited to the following: (n-butylamido)dimethyl($\eta^5$-tetramethylcyclopentadienyl)silanetitanium (III) 2-(N,N-dimethylamino)benzyl; (t-butylamido)dimethyl($\eta^5$-tetramethylcyclopentadienyl)silanetitanium (III) 2-(N,N-dimethylamino)benzyl; (cyclododecylamido)dimethyl($\eta^5$-tetramethylcyclopentadienyl)silanetitanium (III) 2-(N,N-dimethylamino)benzyl; (2,4,6-trimethylanilido)dimethyl($\eta^5$-tetramethylcyclopentadienyl)silanetitanium (III) 2-(N,N-dimethylamino)benzyl; (1-adamantylamido)dimethyl($\eta^5$-tetramethylcyclopentadienyl)silanetitanium (III) 2-(N,N-dimethylamino)benzyl; (t-butylamido)dimethyl($\eta^5$-tetramethylcyclopentadienyl)silanetitanium (III) 2-(N,N-dimethylamino)benzyl; (n-butylamido)diisopropoxy($\eta^5$-tetramethylcyclopentadienyl)silanetitanium (III) 2-(N,N-dimethylamino)benzyl; (cyclododecylamido)diisopropoxy($\eta^5$-tetramethylcyclopentadienyl)silanetitanium (III) 2-(N,N-dimethylamino)benzyl; (2,4,6-trimethylanilido)diisopropoxy($\eta^5$-2-methylindenyl)silanetitanium (III) 2-(N,N-dimethylamino)benzyl; (1-adamantylamido)diisopropoxy($\eta^5$-tetramethylcyclopentadienyl)silanetitanium (III) 2-(N,N-dimethylamino)benzyl; (n-butylamido)dimethoxy($\eta^5$-tetramethylcyclopentadienyl)silanetitanium (III) 2-(N,N-dimethylamino)benzyl; (cyclododecylamido)dimethoxy($\eta^5$-tetramethylcyclopentadienyl)silanetitanium (III) 2-(N,N-dimethylamino)benzyl; (1-adamantylamido)dimethoxy($\eta^5$-tetramethylcyclopentadienyl)silanetitanium (III) 2-(N,N-dimethylamino)benzyl; (2,4,6-trimethylanilido)dimethoxy($\eta^5$-tetramethylcyclopentadienyl)silanetitanium (III) 2-(N,N-dimethylamino)benzyl; (n-butylamido)ethoxymethyl($\eta^5$-tetramethylcyclopentadienyl)silanetitanium (III) 2-(N,N-dimethylamino)benzyl; (cyclododecylamido)ethoxymethyl($\eta^5$-tetramethylcyclopentadienyl)silanetitanium (III) 2-(N,N-dimethylamino)benzyl; (2,4,6-trimethylanilido)ethoxymethyl($\eta^5$-tetramethylcyclopentadienyl)silanetitanium (III) 2-(N,N-dimethylamino)benzyl; and (1-adamantylamido)ethoxymethyl($\eta^5$-tetramethylcyclopentadienyl)silanetitanium (III) 2-(N,N-dimethylamino)benzyl.

Exemplary constrained geometry metal complexes in which titanium is present in the +2 oxidation state include but are not limited to the following: (n-butylamido)-dimethyl-($\eta^5$-tetramethylcyclopentadienyl)silanetitanium (II) 1,4-diphenyl-1,3-butadiene; (n-butylamido)dimethyl ($\eta^5$-tetramethylcyclopentadienyl)silanetitanium (II) 1,3-pentadiene; (t-5-butylamido)dimethyl($\eta^5$-tetramethylcyclopentadienyl)silanetitanium (II) 1,4-diphenyl-1,3-butadiene; (t-butylamido)dimethyl($\eta^5$-tetramethylcyclopentadienyl)silanetitanium (II) 1,3-pentadiene; (cyclododecylamido)dimethyl-($\eta^5$-tetramethylcyclopentadienyl)silanetitanium (II) 1,4-diphenyl-1,3-butadiene; (cyclododecylamido)dimethyl($\eta^5$-tetramethylcyclopentadienyl)silanetitanium (II) 1,3-pentadiene; (2,4,6-trimethylanilido)dimethyl($\eta^5$-tetramethylcyclopentadienyl)silanetitanium (II)1,4-diphenyl-1,3-butadiene; (2,4,6-trimethylanilido)dimethyl ($\eta$5-tetramethylcyclopentadienyl)silanetitanium (II) 1,3-pentadiene; (2,4,6-trimethylanilido)dimethyl($\eta^5$-tetramethylcyclopentadienyl)silanetitanium (IV) dimethyl; (1-adamantylamido)dimethyl($\eta^5$-tetramethylcyclopentadienyl)silanetitanium (II) 1,4-diphenyl-1,3-butadiene; (1-adamantylamido)dimethyl($\eta^5$-tetramethylcyclopentadienyl)silanetitanium (II) 1,3-pentadiene; (t-butylamido)dimethyl($\eta^5$-tetramethylcyclopentadienyl)silanetitanium (II) 1,4-diphenyl-1,3-butadiene; (t-butylamido)dimethyl($\eta^5$-tetramethylcyclopentadienyl)silanetitanium (II) 1,3-pentadiene; (n-butylamido)diisopropoxy($\eta^5$-tetramethylcyclopentadienyl)silanetitanium (II) 1,4-diphenyl-1,3-butadiene; (n-butylamido)diisopropoxy($\eta^5$-tetramethylcyclopentadienyl)silanetitanium (II) 1,3-pentadiene; (cyclododecylamido)diisopropoxy($\eta^5$-tetramethylcyclopentadienyl)silanetitanium (II)1,4-diphenyl-1,3-butadiene; (cyclododecylamido)diisopropoxy($\eta^5$-tetramethylcyclopentadienyl)silanetitanium (II) 1,3-pentadiene; (2,4,6-trimethylanilido)diisopropoxy($\eta^5$-2-methylindenyl)silanetitanium (II)1,4-diphenyl-1,3-butadiene; (2,4,6-trimethylanilido)diisopropoxy($\eta^5$-tetramethylcyclopentadienyl)silanetitanium (II) 1,3-pentadiene; (1-adamantylamido)diisopropoxy($\eta^5$-tetramethylcyclopentadienyl)silanetitanium (II) 1,4-diphenyl-1,3-butadiene; (1-adamantylamido)diisopropoxy($\eta^5$-tetramethylcyclopentadienyl)silanetitanium (II) 1,3-pentadiene; (n-butylamido)dimethoxy($\eta^5$-tetramethylcyclopentadienyl)silanetitanium (II) 1,4-diphenyl-1,3-butadiene; (n-butylamido)dimethoxy($\eta^5$-tetramethylcyclopentadienyl)silanetitanium (II) 1,3-pentadiene; (cyclododecylamido)dimethoxy($\eta^5$-tetramethylcyclopentadienyl)silanetitanium (II) 1,4-diphenyl-1,3-butadiene; (cyclododecylamido)dimethoxy ($\eta^5$-tetramethylcyclopentadienyl)silanetitanium (II) 1,3-pentadiene; (2,4,6-trimethylanilido)dimethoxy($\eta^5$-tetramethylcyclopentadienyl)silanetitanium (II) 1,4-diphenyl-1,3-butadiene; (2,4,6-trimethylanilido)dimethoxy ($\eta^5$-tetramethylcyclopentadienyl)silanetitanium (II) 1,3-pentadiene; (1-adamantylamido)dimethoxy($\eta^5$-tetramethylcyclopentadienyl)silanetitanium (II) 1,4-diphenyl-1,3-butadiene; (1-adamantylamido)dimethoxy($\eta^5$- tetramethylcyclopentadienyl)silanetitanium (II) 1,3-pentadiene; (n-butylamido)ethoxymethyl($\eta^5$-tetramethylcyclopentadienyl)silanetitanium (II) 1,4-diphenyl-1,3-butadiene; (n-butylamido)ethoxymethyl($\eta^5$-tetramethylcyclopentadienyl)silanetitanium (II) 1,3-pentadiene; (cyclododecylamido)ethoxymethyl($\eta^5$-tetramethylcyclopentadienyl)silanetitanium (II) 1,4-diphenyl-1,3-butadiene; (cyclododecylamido)ethoxymethyl ($\eta^5$-tetramethylcyclopentadienyl)silanetitanium (II) 1,3-pentadiene; (2,4,6-trimethylanilido)ethoxymethyl($\eta^5$-tetramethylcyclopentadienyl)silanetitanium (II)1,4-diphenyl-1,3-butadiene; (2,4,6-trimethylanilido) ethoxymethyl($\eta^5$-tetramethylcyclopentadienyl) silanetitanium (II) 1,3-pentadiene; (1-adamantylamido) ethoxymethyl($\eta^5$-tetramethylcyclopentadienyl) silanetitanium (II) 1,4-diphenyl-1,3-butadiene; and (1-adamantylamido)ethoxymethyl($\eta^5$-tetramethylcyclopentadienyl)silanetitanium (II) 1,3-pentadiene.

The complexes can be prepared by use of well known synthetic techniques. The reactions are conducted in a suitable noninterfering solvent at a temperature from −100 to 300° C., preferably from −78 to 100° C., most preferably from 0 to 50° C. A reducing agent may be used to cause the metal to be reduced from a higher to a lower oxidation state. Examples of suitable reducing agents are alkali metals, alkaline earth metals, aluminum and zinc, alloys of alkali metals or alkaline earth metals such as sodium/mercury amalgam and sodium/potassium alloy, sodium naphthalenide, potassium graphite, lithium alkyls, lithium or potassium alkadienyls, and Grignard reagents.

Suitable reaction media for the formation of the complexes include aliphatic and aromatic hydrocarbons, ethers, and cyclic ethers, particularly branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; aromatic and hydrocarbyl-substituted aromatic compounds such as benzene, toluene, and xylene, $C_{1-4}$ dialkyl ethers, $C_{1-4}$ dialkyl ether derivatives of (poly)alkylene glycols, and tetrahydrofuran. Mixtures of the foregoing are also suitable.

Suitable activating cocatalysts and activating techniques have been previously taught with respect to different metal complexes in the following references: EP-A-277,003, U.S. Pat. No. 5,153,157, U.S. Pat. No. 5,064,802, EP-A-468,651 (equivalent to U.S. Ser. No. 07/547,718, ABN), EP-A-520, 732 (equivalent to U.S. Ser. No. 07/876,268, U.S. Pat. No. 5,721,185), WO 95/00683 (equivalent to U.S. Ser. No. 08/82,201), and EP-A-520,732 (equivalent to U.S. Ser. No. 07/884,966 filed May 1, 1992, U.S. Pat. No. 5,350,723), the teachings of which are hereby incorporated by reference.

Suitable activating cocatalysts for use herein include perfluorinated tri(aryl)boron compounds, and most especially tris(pentafluorophenyl)borane; nonpolymeric, compatible, noncoordinating, ion forming compounds (including the use of such compounds under oxidizing conditions), especially the use of ammonium-, phosphonium-, oxonium-, carbonium-, silylium- or sulfonium-salts of compatible, noncoordinating anions, and ferrocenium salts of compatible, noncoordinating anions. Suitable activating techniques include the use of bulk electrolysis (explained in more detail hereinafter). A combination of the foregoing activating cocatalysts and techniques may be employed as well.

Illustrative, but not limiting, examples of boron compounds which may be used as an activating cocatalysts are:

tri-substituted ammonium salts such as: trimethylammonium tetrakis(pentafluoro-phenyl) borate; triethylammonium tetrakis(pentafluorophenyl) borate; tripropylammonium tetrakis(pentafluorophenyl) borate; tri(n-butyl) ammonium tetrakis(pentafluorophenyl) borate; tri(sec-butyl)ammonium tetrakis(pentafluoro-phenyl) borate; N,N-dimethylanilinium tetrakis(pentafluorophenyl) borate; N,N-dimethylanilinium n-butyltris(pentafluorophenyl) borate; N,N-dimethylanilinium benzyltris(pentafluorophenyl) borate; N,N-dimethylanilinium tetrakis(4-(t-butyldimethylsilyl)-2,3,5,6-tetrafluorophenyl) borate; N,N-dimethylanilinium tetrakis(4-(triisopropylsilyl)-2,3,5,6-tetrafluorophenyl) borate; N,N-dimethylanilinium pentafluorophenoxytris(pentafluorophenyl) borate; N,N-diethylanilinium tetrakis(pentafluorophenyl) borate; N,N-dimethyl-2,4,6-trimethylanilinium tetrakis (pentafluorophenyl) borate; trimethylammonium tetrakis(2, 3,4,6-tetrafluorophenyl)borate; triethylammonium tetrakis (2,3,4,6-tetrafluorophenyl) borate; tripropylammonium tetrakis(2,3,4,6-tetrafluorophenyl) borate; tri(n-butyl) ammonium tetrakis(2,3,4,6-tetrafluorophenyl) borate; dimethyl(t-butyl)ammonium tetrakis(2,3,4,6-tetrafluorophenyl) borate; N,N-dimethylanilinium tetrakis (2,3,4,6-tetrafluorophenyl) borate; N,N-diethylanilinium tetrakis(2,3,4,6-tetrafluorophenyl) borate; and N,N-dimethyl-2,4,6-trimethylanilinium tetrakis(2,3,4,6-tetrafluorophenyl) borate;

disubstituted ammonium salts such as: di-(i-propyl) ammonium tetrakis(pentafluoro-phenyl) borate; and dicyclohexylammonium tetrakis(pentafluorophenyl) borate;

trisubstituted phosphonium salts such as: triphenylphosphonium tetrakis(pentafluoro-phenyl) borate; tri(o-tolyl) phosphonium tetrakis(pentafluorophenyl) borate; and tri(2, 6-dimethylphenyl)phosphonium tetrakis(pentafluorophenyl) borate;

disubstituted oxonium salts such as: diphenyloxonium tetrakis(pentafluorophenyl) borate; di(o-tolyl)oxonium tetrakis(pentafluorophenyl) borate; and di(2,6-dimethylphenyl)oxonium tetrakis(pentafluorophenyl) borate; and disubstituted sulfonium salts such as: diphenylsulfonium tetrakis(pentafluorophenyl) borate; di(o-tolyl)sulfonium tetrakis(pentafluorophenyl) borate; and bis(2,6-dimethylphenyl)sulfonium tetrakis(pentafluorophenyl) borate.

A most preferred activating cocatalyst is trispentafluorophenylborane.

Alumoxanes, especially methylalumoxane or triisobutylaluminum modified methylalumoxane are also suitable activators and may be used for activating the present metal complexes.

The molar ratio of metal complex: activating cocatalyst employed preferably ranges from 1:1000 to 2:1, more preferably from 1:5 to 1.5:1, most preferably from 1:2 to 1:1. In the preferred case in which a metal complex is activated by trispentafluorophenylborane and triisobutylaluminum modified methylalumoxane, the titanium:boron:aluminum molar ratio is typically from 1:10:50 to 1:0.5:0.1, most typically from about 1:3:5.

A support, especially silica, alumina, or a polymer (especially poly(tetrafluoroethylene) or a polyolefin) may be employed, and desirably is employed when the catalysts are used in a gas phase polymerization process. The support is preferably employed in an amount to provide a weight ratio of catalyst (based on metal):support from 1:100,000 to 1:10, more preferably from 1:50,000 to 1:20, and most preferably from 1:10,000 to 1:30.

At all times, the individual ingredients as well as the recovered catalyst components must be protected from oxygen and moisture. Therefore, the catalyst components and catalysts must be prepared and recovered in an oxygen and moisture free atmosphere. Preferably, therefore, the reactions are performed in the presence of an dry, inert gas such as, for example, nitrogen.

In general, the polymerization may be accomplished at conditions for Ziegler-Natta or Kaminsky-Sinn type polymerization reactions, that is, reactor pressures ranging from atmospheric to 3500 atmospheres. The reactor temperature should be greater than 80° C., typically from 100° C. to 250° C., and preferably from 100° C. to 150° C., with higher reactor temperatures, i.e., reactor temperatures greater than 100° C. generally favoring the formation of lower molecular weight polymers.

In conjunction with the reactor temperature, the hydrogen:ethylene molar ratio influences the molecular weight of the polymer, with greater hydrogen levels leading to lower molecular weight polymers. When the desired polymer has an $I_2$ of 1 g/10 min, the hydrogen:ethylene molar ratio will typically be 0:1. When the desired polymer has an $I_2$ of 1000 g/10 min., the hydrogen:ethylene molar ratio will typically be from 0.45:1 to 0.7:1. The upper limit of the hydrogen:ethylene molar ratio is about 2.2–2.5:1.

Generally the polymerization process is carried out with a differential pressure of ethylene of from about 10 to about 1000 psi (70 to 7000 kPa), most preferably from about 40 to about 60 psi (30° to 400 kPa). The polymerization is generally conducted at a temperature of from 80 to 250° C., preferably from 90 to 170° C., and most preferably from greater than 95 to 140° C.

In most polymerization reactions the molar ratio of catalyst:polymerizable compounds employed is from $10^{-12}$:1 to $10^{-1}$:1, more preferably from $10^{-9}$:1 to $10^{-5}$:1.

Solution polymerization conditions utilize a solvent for the respective components of the reaction. Preferred solvents include mineral oils and the various hydrocarbons which are liquid at reaction temperatures. Illustrative examples of useful solvents include alkanes such as pentane, isopentane, hexane, heptane, octane and nonane, as well as mixtures of alkanes including kerosene and Isopar E™, available from Exxon Chemicals Inc.; cycloalkanes such as cyclopentane and cyclohexane; and aromatics such as benzene, toluene, xylenes, ethylbenzene and diethylbenzene.

The solvent will be present in an amount sufficient to prevent phase separation in the reactor. As the solvent functions to absorb heat, less solvent leads to a less adiabatic reactor. The solvent:ethylene ratio (weight basis) will typically be from 2.5:1 to 12:1, beyond which point catalyst efficiency suffers. The most typical solvent:ethylene ratio (weight basis) is in the range of from 5:1 to 10:1.

The polymerization may be carried out as a batchwise or a continuous polymerization process, with continuous polymerizations processes being required for the preparation of substantially linear polymers. In a continuous process, ethylene, comonomer, and optionally solvent and diene are continuously supplied to the reaction zone and polymer product continuously removed therefrom.

The ultra-low molecular weight polymers of the invention may further be made in a slurry polymerization process, using the catalysts as described above as supported in an inert support, such as silica. As a practical limitation, slurry polymerization takes place in liquid diluents in which the polymer product is substantially insoluble. Typically, the diluent for slurry polymerization is one or more hydrocarbons with less than 5 carbon atoms. If desired, saturated hydrocarbons such as ethane, propane or butane may be used in whole or part as the diluent. Likewise the comonomer or a mixture of different comonomers may be used in whole or part as the diluent. Typically, the diluent comprises in at least major part the comonomer(s) to be polymerized.

The ultra-low molecular weight polymers of the invention may be polymerized in a first reactor, with a second polymer (of higher molecular weight and/or of different density, and/or which is heterogeneous) being polymerized in a second reactor which is connected in series or in parallel to that in which the ultra-low molecular weight polymer is produced, to prepare in-reactor polymer blends having desirable properties. An example of a dual reactor process which may be adapted in accordance with the teachings of this disclosure to prepare blends wherein at least one component is an ultra-low molecular weight polymer of this invention, is disclosed in WO 94/00500, equivalent to U.S. Ser. No. 07/904,770, as well as U.S. Ser. No. 08/10958, filed Jan. 29, 1993, the teachings of which are incorporated herein by reference.

Additives such as antioxidants (e.g., hindered phenolics (e.g., Irganox™ 1010, Irganox™ 1076), phosphites (e.g., Irgafos™ 168)), antiblock additives, pigments, fillers, and the like can also be included in the modified formulations, to the extent that they do not interfere with the desired formulation properties.

The skilled artisan will appreciate that the invention disclosed herein may be practiced in the absence of any component which has not been specifically disclosed. The following examples are provided as further illustration of the invention and are not to be construed as limiting. Unless stated to the contrary all parts and percentages are expressed on a weight basis.

Catalyst Preparation One

Part 1: Preparation of $TiCl_3(DME)_{1.5}$

The apparatus (referred to as R-1) was set-up in the hood and purged with nitrogen; it consisted of a 10 L glass kettle with flush mounted bottom valve, 5-neck head, polytetrafluoroethylene gasket, clamp, and stirrer components (bearing, shaft, and paddle). The necks were equipped as follows: stirrer components were put on the center neck, and the outer necks had a reflux condenser topped with gas inlet/outlet, an inlet for solvent, a thermocouple, and a stopper. Dry, deoxygenated dimethoxyethane (DME) was added to the flask (approx. 5 L). In the drybox, 700 g of $TiCl_3$ was weighed into an equalizing powder addition funnel; the funnel was capped, removed from the drybox, and put on the reaction kettle in place of the stopper. The $TiCl_3$ was added over about 10 minutes with stirring. After the addition was completed, additional DME was used to wash the rest of the $TiCl_3$ into the flask. The addition funnel was replaced with a stopper, and the mixture heated to reflux. The color changed from purple to pale blue. The mixture was heated for about 5 hours, cooled to room temperature, the solid was allowed to settle, and the supernatant was decanted from the solid. The $TiCl_3(DME)_{1.5}$ was left in R-1 as a pale blue solid.

Part 2: Preparation of $[(Me_4C_5)SiMe_4N-t-Bu][MgCl]_2$

The apparatus (referred to as R-2) was set-up as described for R-1, except that flask size was 30 L. The head was equipped with seven necks; stirrer in the center neck, and the outer necks containing condenser topped with nitrogen inlet/outlet, vacuum adapter, reagent addition tube, thermocouple, and stoppers. The flask was loaded with 4.5 L of toluene, 1.14 kg of $(Me_4C_5H)SiMe_2NH-t-Bu$, and 3.46 kg of 2 M i-PrMgCl in $Et_2O$. The mixture was then heated, and the ether allowed to boil off into a trap cooled to −78° C. After four hours, the temperature of the mixture had reached 75° C. At the end of this time, the heater was turned off and DME was added to the hot, stirring solution, resulting in the formation of a white solid. The solution was allowed to cool to room temperature, the material was allowed to settle, and the supernatant was decanted from the solid. The [(Me$_4$C$_5$)SiMe$_2$N-t-Bu][MgCl]$_2$ was left in R-2 as an off-white solid.

Part 3: Preparation of [(η$^5$-Me$_4$C$_5$)SiMe$_2$N-t-Bu]TiMe$_2$

The materials in R-1 and R-2 were slurried in DME (3 L of DME in R-1 and 5 L in R-2). The contents of R-1 were transferred to R-2 using a transfer tube connected to the bottom valve of the 10 L flask and one of the head openings in the 30 L flask. The remaining material in R-1 was washed over using additional DME. The mixture darkened quickly to a deep red/brown color, and the temperature in R-2 rose from 21° C. to 32° C. After 20 minutes, 160 mL of CH$_2$Cl$_2$ was added through a dropping funnel, resulting in a color change to green/brown. This was followed by the addition of 3.46 kg of 3 M MeMgCl in THF, which caused a temperature increase from 22° C. to 52° C. The mixture was stirred for 30 minutes, then 6 L of solvent was removed under vacuum. Isopar E (6 L) was added to the flask. This vacuum/solvent addition cycle was repeated, with 4 L of solvent removed and 5 L of Isopar E added. In the final vacuum step, an additional 1.2 L of solvent was removed. The material was allowed to settle overnight, then the liquid layer decanted into another 30 L glass kettle (R-3). The solvent in R-3 was removed under vacuum to leave a brown solid, which was re-extracted with Isopar E; this material was transferred into a storage cylinder. Analysis indicated that the solution (17.23 L) was 0.1534 M in titanium; this is equal to 2.644 moles of [(η$^5$-Me$_4$C$_5$)SiMe$_2$N-t-Bu]TiMe$_2$. The remaining solids in R-2 were further extracted with Isopar E, the solution was transferred to R-3, then dried under vacuum and re-extracted with Isopar E. This solution was transferred to storage bottles; analysis indicated a concentration of 0.1403 M titanium and a volume of 4.3 L (0.6032 moles [(η$^5$-Me$_4$C$_5$)SiMe$_2$N-t-Bu]TiMe$_2$). This gives an overall yield of 3.2469 moles of [(η$^5$-Me$_4$C$_5$)SiMe$_2$N-t-Bu]TiMe$_2$, or 1063 g. This is a 72% yield overall based on the titanium added as TiCl$_3$.

Catalyst Preparation Two

Part 1: Preparation of TiCl$_3$(DME)$_{1.5}$

The apparatus (referred to as R-1) was set-up in the hood and purged with nitrogen; it consisted of a 10 L glass kettle with flush mounted bottom valve, 5-neck head, polytetrafluoroethylene gasket, clamp, and stirrer components (bearing, shaft, and paddle). The necks were equipped as follows: stirrer components were put on the center neck, and the outer necks had a reflux condenser topped with gas inlet/outlet, an inlet for solvent, a thermocouple, and a stopper. Dry, deoxygenated dimethoxyethane (DME) was added to the flask (approx. 5.2 L). In the drybox, 300 g of TiCl$_3$ was weighed into an equalizing powder addition funnel; the funnel was capped, removed from the drybox, and put on the reaction kettle in place of the stopper. The TiCl$_3$ was added over about 10 minutes with stirring. After the addition was completed, additional DME was used to wash the rest of the TiCl$_3$ into the flask. This process was then repeated with 325 g of additional TiCl$_3$, giving a total of 625 g. The addition funnel was replaced with a stopper, and the mixture heated to reflux. The color changed from purple to pale blue. The mixture was heated for about 5 hours, cooled to room temperature, the solid was allowed to settle, and the supernatant was decanted from the solid. The TiCl$_3$(DME)$_{1.5}$ was left in R-1 as a pale blue solid.

Part 2: Preparation of [(Me$_4$C$_5$)SiMe$_2$N-t-Bu][MgCl]$_2$

The apparatus (referred to as R-2) was set-up as described for R-1, except that flask size was 30 L. The head was equipped with seven necks; stirrer in the center neck, and the outer necks containing condenser topped with nitrogen inlet/outlet, vacuum adapter, reagent addition tube, thermocouple, and stoppers. The flask was loaded with 7 L of toluene, 3.09 kg of 2.17 M i-PrMgCl in Et$_2$O, 250 mL of THF, and 1.03 kg of (Me$_4$C$_5$H)SiMe$_2$NH-t-Bu. The mixture was then heated, and the ether allowed to boil off into a trap cooled to −78° C. After three hours, the temperature of the mixture had reached 80° C., at which time a white precipitate formed. The temperature was then increased to 90° C. over 30 minutes and held at this temperature for 2 hours. At the end of this time, the heater was turned off, and 2 L of DME was added to the hot, stirring solution, resulting in the formation of additional precipitate. The solution was allowed to cool to room temperature, the material was allowed to settle, and the supernatant was decanted from the solid. An additional wash was done by adding toluene, stirring for several minutes, allowing the solids to settle, and decanting the toluene solution. The [(Me$_4$C$_5$)SiMe$_2$N-t-Bu][MgCl]$_2$ was left in R-2 as an off-white solid.

Part 3: Preparation of [(η5-Me$_4$C$_5$)SiMe$_2$N-t-Bu]Ti(η$^4$-1,3-pentadiene)

The materials in R-1 and R-2 were slurried in DME (the total volumes of the mixtures were approx. 5 L in R-1 and 12 L in R-2). The contents of R-1 were transferred to R-2 using a transfer tube connected to the bottom valve of the 10 L flask and one of the head openings in the 30 L flask. The remaining material in R-1 was washed over using additional DME. The mixture darkened quickly to a deep red/brown color. After 15 minutes, 1050 mL of 1,3-pentadiene and 2.60 kg of 2.03 M n-BuMgCl in THF were added simultaneously. The maximum temperature reached in the flask during this addition was 53° C. The mixture was stirred for 2 hours, then approx. 11 L of solvent was removed under vacuum. Hexane was then added to the flask to a total volume of 22 L. The material was allowed to settle, and the liquid layer (12 L) was decanted into another 30 L glass kettle (R-3). An additional 15 liters of product solution was collected by adding hexane to R-2, stirring for 50 minutes, again allowing to settle, and decanting. This material was combined with the first extract in R-3. The solvent in R-3 was removed under vacuum to leave a red/black solid, which was then extracted with toluene. This material was transferred into a storage cylinder. Analysis indicated that the solution (11.75 L) was 0.255 M in titanium; this is equal to 3.0 moles of [(η$^5$-Me$_4$C$_5$)SiMe$_2$N-t-Bu]Ti(η4-1,3-pentadiene) or 1095 g. This is a 74% yield based on the titanium added as TiCl$_3$.

EXAMPLES 1–14 AND COMPARATIVE EXAMPLES C1–C4

The polymer products of Examples 1–14 and Comparative Examples C1–C4 are produced in a solution polymerization process using a continuously stirred reactor. Additives (e.g., antioxidants, pigments, etc.) can be incorporated into the interpolymer products either during the pelletization step or after manufacture, with a subsequent re-extrusion. Examples 1–7 and Comparative Examples C1–C2 were each stabilized with 1250 ppm calcium stearate, 500 ppm Irganox™ 1076 hindered polyphenol stabilizer (available from Ciba-Geigy Corporation), and 800 ppm PEPQ (tetrakis(2, 4-di-t-butylphenyl)-4,4 -biphenylene diphosphonite) (available from Clariant Corporation). Examples 8–14 and Comparative Examples C3–C4 were each stabilized with 500 ppm Irganox™ 1076, 800 ppm PEPQ, and 100 ppm water (as a catalyst kill agent).

The ethylene and the hydrogen were combined into one stream before being introduced into the diluent mixture, a mixture of $C_8$–$C_{10}$ saturated hydrocarbons, e.g., Isopar-E hydrocarbon mixture (available from Exxon Chemical Company) and the comonomer. In Examples 1–11 and Comparative Examples C1–C4 the comonomer was 1-octene; in Examples 13–14, the comonomer was 1-butene; and Example 12 had no comonomer. The reactor feed mixture was continuously injected into the reactor.

The metal complex and cocatalysts were combined into a single stream and were also continuously injected into the reactor. For Examples 1–7 and Comparative Examples C1–C2, the catalyst was as prepared in Catalyst Description One set forth above. For Examples 8–14 and Comparative Examples C2–C4, the catalyst was as prepared in Catalyst Description Two set forth above. For Examples 1–14 and Comparative Examples C1–C4, the co-catalyst was tris (pentafluorophenyl)borane, available as a 3 wt % solution in Isopar™-E mixed hydrocarbon, from Boulder Scientific. Aluminum was provided in the form of a solution of modified methylalumoxane (MMAO Type 3A) in heptane, which is available at a 2 wt % aluminum concentration from Akzo Nobel Chemical Inc.

Sufficient residence time was allowed for the metal complex and cocatalyst to react prior to introduction into the polymerization reactor. For the polymerization reactions of Examples 1–14 and Comparative Examples C1–C4, the reactor pressure was held constant at about 475 psig. Ethylene content of the reactor, in each of Examples 1–14 and Comparative Examples C1–C4, after reaching steady state, was maintained at the conditions specified in Table One.

After polymerization, the reactor exit stream is introduced into a separator where the molten polymer is separated from the unreacted comonomer(s), unreacted ethylene, unreacted hydrogen, and diluent mixture stream. The molten polymer is subsequently strand chopped or pelletized, and, after being cooled in a water bath or pelletizer, the solid pellets are collected. Table I describes the polymerization conditions and the resultant polymer properties.

TABLE ONE

| | C1 | Ex. 1 | C2 | Ex. 2 | Ex. 3 | Ex. 4 | Ex. 5 | Ex. 6 | Ex. 7 | C3 |
|---|---|---|---|---|---|---|---|---|---|---|
| Ethylene feed (lb/hr) | 2.0 | 2.0 | 2.0 | 2.0 | 2.0 | 2.0 | 3.0 | 3.0 | 3.0 | 3.0 |
| Comonomer:olefin ratio (mole %) | 18.00 | 18.10 | 12.40 | 12.50 | 12.50 | 8.50 | 4.40 | 0.40 | 0.40 | 11.80 |
| Hydrogen:ethylene ratio (mole %) | 0.00 | 1.22 | 0.26 | 0.48 | 1.26 | 0.66 | 0.68 | 0.72 | 1.60 | 0.34 |
| Diluent:ethylene ratio (weight basis) | 10.20 | 9.80 | 10.60 | 11.10 | 11.10 | 9.30 | 5.90 | 5.90 | 5.90 | 9.99 |
| Catalyst metal concentration (ppm) | 4 | 4 | 4 | 4 | 4 | 2 | 5 | 5 | 5 | 3 |
| Catalyst flow rate (lb/hr) | 0.280 | 0.313 | 0.272 | 0.316 | 0.428 | 0.386 | 0.417 | 0.441 | 0.626 | 0.449 |
| Co-catalyst concentration (ppm) | 88 | 88 | 88 | 88 | 88 | 44 | 353 | 353 | 353 | 88 |
| Co-catalyst flow rate (lb/hr) | 0.408 | 0.455 | 0.396 | 0.460 | 0.624 | 0.561 | 0.190 | 0.200 | 0.284 | 0.490 |
| Aluminum concentration (ppm) | 10 | 10 | 10 | 10 | 10 | 5 | 20 | 20 | 20 | 9.8 |
| Aluminum flow rate (lb/hr) | 0.385 | 0.431 | 0.375 | 0.438 | 0.590 | 0.528 | 0.357 | 0.376 | 0.534 | 0.461 |
| Reactor temperature (°C.) | 110 | 110 | 110 | 110 | 110 | 110 | 140 | 140 | 140 | 110 |
| Ethylene concentration in reactor exit stream (weight %) | 2.17 | 2.48 | 1.80 | 1.69 | 1.65 | 2.99 | 4.44 | 4.14 | 4.41 | 1.75 |
| Polymer density (g/cm³) | 0.858 | 0.855 | 0.875 | 0.871 | 0.870 | 0.897 | 0.929 | 0.963 | 0.968 | 0.872 |
| Polymer melt viscosity at 350° F. (centipoise) | 309000* | 350 | 39000* | 4200 | 355 | 5200 | 5600 | 5200 | 395 | 15,000 |
| Polymer melt index ($I_2$ at 190° C.) | 32 | 16200* | 246 | 1800* | 16000* | 1500* | 1400* | 1500* | 14500* | 583* |
| Polymer Mw | 69,400 | 8,700 | 30,000 | 16,500 | 7,900 | 15,600 | 15,800 | 15,800 | 7,300 | 23,200 |
| Polymer Mn | 29,100 | 4,600 | 17,100 | 9,100 | 4,300 | 8,700 | 8,900 | 8,000 | 3,700 | 11,900 |
| Polymer Mw/Mn | 2.08 | 1.89 | 1.76 | 1.81 | 1.84 | 1.79 | 1.78 | 1.98 | 1.97 | 1.95 |
| Peak crystallization temperature by DSC (°C.) | 23.73 | 27.13 | 55.73 | 55.44 | 59.05 | 78.57 | 102.76 | 116.01 | 114.76 | 55.73 |
| Peak melting temperature by DSC (°C.) | 45.63 | 57 | 68 | 67 | 67 | 91.04 | 112.22 | 129.23 | 127.6 | 68 |
| Total percent crystallinity by DSC | 7.46 | 9.98 | 18.94 | 17.78 | 19.55 | 36.3 | 38.42 | 76.03 | 79.62 | 18.94 |
| FIG. No. | | 2(b) | 3(b) | 3(c) | 3(d) | 4 | | 6 | | 7(b) |

| | Ex. 8 | C4 | Ex. 9 | Ex. 10 | Ex. 11 | Ex. 12 | Ex. 13 | Ex. 14 |
|---|---|---|---|---|---|---|---|---|
| Ethylene feed (lb/hr) | 3.0 | 3.0 | 3.0 | 3.0 | 3.0 | 3.0 | 3.0 | 3.0 |
| Comonomer:olefin ratio (mole %) | 9.10 | 7.40 | 7.40 | 7.30 | 1.24 | 0.00 | 17.10 | 12.70 |
| Hydrogen:ethylene ratio (mole %) | 0.54 | 0.42 | 0.56 | 0.76 | 2.14 | 2.14 | 0.54 | 0.62 |

TABLE ONE-continued

| | | | | | | | | |
|---|---|---|---|---|---|---|---|---|
| Diluent:ethylene ratio (weight basis) | 9.99 | 8.59 | 8.59 | 8.59 | 7.69 | 7.70 | 9.99 | 9.00 |
| Catalyst metal concentration (ppm) | 3 | 3 | 3 | 3 | 32 | 32 | 8 | 8 |
| Catalyst flow rate (lb/hr) | 0.450 | 0.466 | 0.555 | 0.713 | 0.304 | 0.294 | 0.392 | 0.207 |
| Co-catalyst concentration (ppm) | 88 | 88 | 88 | 88 | 1430 | 1430 | 353 | 353 |
| Co-catalyst flow rate (lb/hr) | 0.490 | 0.500 | 0.605 | 0.777 | 0.219 | 0.211 | 0.278 | 0.150 |
| Aluminum concentration (ppm) | 9.8 | 9.8 | 9.8 | 9.8 | 120.0 | 120.0 | 39.8 | 39.8 |
| Aluminum flow rate (lb/hr) | 0.468 | 0.480 | 0.574 | 0.731 | 0.323 | 0.311 | 0.260 | 0.141 |
| Reactor temperature (°C.) | 110 | 120 | 110 | 110 | 110 | 110 | 110 | 110 |
| Ethylene concentration in reactor exit stream (weight %) | 1.71 | 1.41 | 2.17 | 2.48 | 1.80 | 1.69 | 1.65 | 2.99 |
| Polymer density (g/cm$^3$) | 0.883 | 0.898 | 0.897 | 0.894 | 0.948 | 0.960 | 0.868 | 0.887 |
| Polymer melt viscosity at 350° F. (centipoise) | 5000 | 15,000 | 5200 | 2500 | 350 | 512 | 5290 | 5000 |
| Polymer melt index ($I_2$ at 190° C. (g/10 min.)) | 1500* | 580* | 1500* | 2900* | 16000* | 11600* | | |
| Polymer Mw | 16,200 | 20,300 | 16,100 | 12,000 | 6,900 | 7,400 | | |
| Polymer Mn | 8,200 | 10,400 | 8,900 | 5,800 | 3,200 | 3,200 | | |
| Polymer Mw/Mn | 1.98 | 1.95 | 1.81 | 2.07 | 2.16 | 2.31 | | |
| Peak crystallization temperature by DSC (°C.) | 69.27 | 79.85 | 78.57 | 81.22 | 109.88 | 116.39 | 47.15 | 65.65 |
| Peak melting temperature by DSC (°C.) | 81.97 | 92.62 | 91.04 | 92.43 | 120.5 | 131.11 | 55 | 78.06 |
| Total percent crystallinity by DSC | 28.18 | 36.76 | 36.3 | 37.81 | 72.81 | 72.84 | 13.06 | 26.39 |
| FIG. No. | | | | | | | 8 | 9 |

*Calculated on the basis of melt viscosity correlations in accordance with the formula:
$I_2 = 3.6126(10^{\log(\eta)-6.6928)/-1.1363}) - 9.3185$,
where $\eta$ = melt viscosity at 350° F.

EXAMPLES 15–16 AND COMPARATIVE EXAMPLE C5

The polymer products of Examples 15–16 and Comparative Example C5 were produced in a solution polymerization process using a well-mixed recirculating loop reactor. Each polymer was stabilized with 2000 ppm IRGANOX™ 1076 hindered polyphenol stabilizer (available from Ciba-Geigy Corporation) and 35 ppm deionized water (as a catalyst kill agent).

The ethylene and the hydrogen (as well as any ethylene and hydrogen which were recycled from the separator, were combined into one stream before being introduced into the diluent mixture, a mixture of $C_8$–$C_{10}$ saturated hydrocarbons, e.g., ISOPAR™-E (available from Exxon Chemical Company) and the comonomer 1-octene.

The metal complex and cocatalysts were combined into a single stream and were also continuously injected into the reactor. The catalyst was as prepared in Catalyst Description Two set forth above; the primary cocatalyst was tri (pentafluorophenyl)borane, available from Boulder Scientific as a 3 wt % solution in ISOPAR-E mixed hydrocarbon; and the secondary cocatalyst was modified methylalumoxane (MMAO Type 3A), available from Akzo Nobel Chemical Inc. as a solution in heptane having 2 wt % aluminum.

Sufficient residence time was allowed for the metal complex and cocatalyst to react prior to introduction into the polymerization reactor. The reactor pressure was held constant at about 475 psig.

After polymerization, the reactor exit stream was introduced into a separator where the molten polymer was separated from the unreacted comonomer(s), unreacted ethylene, unreacted hydrogen, and diluent mixture stream, which was in turn recycled for combination with fresh comonomer, ethylene, hydrogen, and diluent, for introduction into the reactor. The molten polymer was subsequently strand chopped or pelletized, and, after being cooled in a water bath or pelletizer, the solid pellets were collected. Table Two describes the polymerization conditions and the resultant polymer properties.

TABLE Two

| | C5 | Ex. 15 | Ex. 16 |
|---|---|---|---|
| Ethylene fresh feed rate (lbs/hr) | 140 | 140 | 140 |
| Total ethylene feed rate (lbs/hr) | 146.2 | 146.17 | 146.5 |
| Fresh octene feed rate (lbs/hr) | 45.4 | 49.5 | 12.67 |
| Total octene feed rate (lbs/hr) | Not determined | 112 | 32.9 |
| Total octene concentration (weight %) | Not determined | 11.4 | 3.36 |
| Fresh hydrogen feed rate (standard cm$^3$/min) | 4025 | 5350 | 16100 |
| Solvent and octene feed rate (lbs/hr) | 840 | 839.4 | 840 |
| Ethylene conversion rate (wt %) | 90.7 | 90.3 | 88.26 |
| Reactor temperature (° C.) | 109.86 | 119.8 | 134.3 |
| Feed temperature (° C.) | 15 | 15 | 15.3 |
| Catalyst concentration (ppm) | 70 | 70 | 70 |
| Catalyst flow rate (lbs/hr) | 0.725 | 1.265 | 4.6 |
| Primary cocatalyst concentration (ppm) | 1200 | 2031 | 1998 |
| Primary cocatalyst flow rate (lbs/hr) | 2.96 | 1.635 | 5.86 |
| Primary cocatalyst to catalyst molar ratio (B:Ti) | 2.96 | 3.48 | 2.897 |
| Secondary cocatalyst concentration (ppm) | 198 | 198 | 198 |
| Secondary cocatalyst flow rate (lbs/hr) | 0.718 | 1.258 | 3.7 |
| Secondary cocatalyst to catalyst molar | 5 | 4.986 | 4.037 |

TABLE Two-continued

|  | C5 | Ex. 15 | Ex. 16 |
|---|---|---|---|
| ratio (Al:Ti) |  |  |  |
| Product density (g/cm³) | 0.8926 | 0.8925 | 0.9369 |
| Product melt viscosity at 350° F. (centipoise) | 12,500 | 4,000 | 400 |
| Polymer melt index (I₂ at 190° C.)* | 686* | 1,900* | 14,000* |
| Polymer Mn | 12,300* | 8,900* | 4,700* |

*Calculated on the basis of melt viscosity correlations in accordance with the formulas:
$I_2 = 3.6126(10^{\log(\eta)-6.6928)/-1.1363}) - 9.3185$, $Mn = 10^{[(\log \eta + 10.46)/3.56]}$
where $\eta$ = melt viscosity at 350° F.

Except as noted, Examples 17–19 were prepared in accordance with the procedure set forth above with respect to Examples 1–14. In particular, Examples 17 and 18 were prepared using a catalyst prepared in accordance with Catalyst Procedure 2. The additives employed were 1000 ppm Irganox™ 1076 hindered polyphenol stabilizer (available from Ciba-Geigy Corporation) and 100 ppm water. In the case of Example 18, ethylbenzene, rather than Isopar™ E mixed hydrocarbon, was utilized as the solvent.

Example 19 was prepared using a catalyst prepared in accordance with Catalyst Procedure 1. The additives employed were 1250 ppm calcium stearate, 500 ppm Irganox™ 1076 hindered polyphenol stabilizer (available from Ciba-Geigy Corporation), and 800 ppm PEPQ (tetrakis(2,4-di-t-butylphenyl)-4,4'-biphenylene diphosphonite) (available from Clariant Corporation).

The run conditions employed and a description of the resultant polymers is set forth in the following Table:

|  | Ex. 17 | Ex. 18 | Ex. 19 |
|---|---|---|---|
| Ethylene fresh feed rate (lbs/hr) | 2.5 | 3.5 | 3.02 |
| Total ethylene feed rate (lbs/hr) | 2.5 | 3.5 | 3.02 |
| Fresh octene feed rate (lbs/hr) | 1.9 | 1.52 | 1.1 |
| Total octene feed rate (lbs/hr) | 1.9 | 1.52 | 1.1 |
| Total octene concentration (weight %) | 11.44 | 6.47 | 5.52 |
| Fresh hydrogen feed rate (standard cm³/min) | 199.9 | 292.4 | 124.9 |
| Solvent and octene feed rate (lbs/hr) | 14.1 | 20.04 | 16.9 |
| Ethylene conversion rate (wt %) | 75.2 | 85.5 | 69.3 |
| Reactor temperature (° C.) | 119.8 | 136.3 | 140.4 |
| Feed temperature (° C.) | 26.9 | 33.93 | 40 |
| Catalyst concentration (ppm) | 12 | 2.4 | 5 |
| Catalyst flow rate (lbs/hr) | .4543 | .60717 | .4174 |
| Primary cocatalyst concentration (ppm) | 92 | 92 | 393 |
| Primary cocatalyst flow rate (lbs/hr) | .67 | .3664 | .18967 |
| Primary cocatalyst to catalyst molar ratio (B:Ti) | — | 2.16 | 3.3 |
| Secondary cocatalyst concentration (ppm) | — | 21.74 | 19.78 |
| Secondary cocatalyst flow rate (lbs/hr) | — | 0.302 | 0.3569 |
| Secondary cocatalyst to catalyst molar ratio (Al:Ti) |  | 8 | 6 |
| Product density (g/cm³) | 0.890 | 0.930 | 0.920 |
| Product melt viscosity at 350° F. (centipoise) | 350 | 400 | 5620 |
| Polymer melt index (I₂ at 190° C.)* | 16,000 | 14,000 | 1400 |
| Polymer Mn* | 4500 | 4700 | 9800 |

*Calculated on the basis of melt viscosity correlations in accordance with the formulas:
$I_2 = 3.6126(10^{\log(\eta)-6.6928)/-1.1363}) - 9.3185$, $Mn = 10^{[(\log \eta + 10.46)/3.56]}$
where $\eta$ = melt viscosity at 350° F.

COMPARATIVE EXAMPLES

To a 4 liter autoclave stirred reactor, 865.9 g of ISOPAR™-E hydrocarbon (available from Exxon Chemical Company) and 800.4 g 1-octene were charged. The reactor was heated to 120° C. and hydrogen was added from a 75 cc cylinder. Hydrogen was added to cause a 250 psig pressure drop in the cylinder. The reactor was then pressurized to 450 psig of ethylene. Catalyst was added at the rate of 1 cc/min. The catalyst was as prepared in the Catalyst One Preparation set forth above and was mixed with other co-catalysts at a ratio of 1.5 mL of a 0.005 M of Catalyst Preparation One, 1.5 mL of a 0.015 M solution of tris(pentafluorophenyl)borane in ISOPAR-E hydrocarbon mixture (a 3 wt % solution of tris(pentafluorophenyl)borane in ISOPAR-E hydrocarbon mixture is available from Boulder Scientific), 1.5 mL of a 0.05 M solution of modified methylalumoxane in ISOPAR-E hydrocarbon mixture (MMAO Type 3A) (a solution of MMAO Type 3A in heptane with a 2 wt % aluminum content is available from Akzo Nobel Chemical Inc.), and 19.5 mL of ISOPAR-E hydrocarbon mixture. Ethylene was supplied on demand. The reactor temperature and pressure were set at 120° C. and 450 psig, respectively. The reaction continued for 23.1 minutes. At this time, the agitation was stopped and the reactor contents transferred to a glass collection kettle. The reactor product was dried in a vacuum oven overnight.

The ethylene/octene product thus prepared had a density of 0.867 g/cm³, and an I₂ at 190° C. of 842 g/10 min.

The following additional comparative examples represent ethylene/1-octene substantially linear polymers prepared in accordance with the teachings of U.S. Pat. Nos. 5,272,236 and 5,278,272, the disclosures of which are incorporated herein by reference. A description of the comparative examples, as well as some representative properties, is set forth in Table Three.

TABLE Three

|  | Density (g/cm³) | Melt index at 190° C. (g/10 min.) | Peak crystallization temperature by DSC (° C.) | Peak melting temperature by DSC (° C.) | Total percent crystallinity by DSC |
|---|---|---|---|---|---|
| Comparative Ex. A | 0.863 | 0.5 | 32.98 | 50.07 | 12.3 |
| Comparative Ex. B | 0.863 | 14 | 39.84 | 57.41 | 13.95 |
| Comparative Ex. C | 0.868 | 0.5 | 42.73 | 56.3 | 15.65 |
| Comparative Ex. D | 0.87 | 1.0 | 47.24 | 55.34 | 13.5 |
| Comparative Ex. E | 0.87 | 5 | 45.6 | 63.44 | 17.05 |
| Comparative Ex. F | 0.87 | 30 | 49.13 | 60.72 | 18.62 |
| Comparative Ex. G | 0.885 | 1 | 62.29 | 80.11 | 26.57 |
| Comparative Ex. H | 0.885 | 30 | 66.63 | 84.43 | 28.15 |
| Comparative Ex. I | 0.902 | 30 | 82.47 | 98.78 | 40.41 |
| Comparative Ex. J | 0.902 | 4.3 | 80.84 | 99.04 | 39.14 |
| Comparative Ex. K | 0.903 | 1 | 82.97 | 99.49 | 36.23 |
| Comparative Ex. L | 0.915 | 1 | 95.78 | 109.0 | 47.91 |

Transmission Electron Micrograph Preparation and Digital Analysis Thereof

Transmission electron micrographs are taken of the specific polymers of the Examples and Comparative Examples, and are set forth in the FIGURES above. In each case, the polymers were formed into compression molded plaques having a thickness of 125 mils and a diameter of 1 inch. The plaques were cooled at the rate of 15° C./minute. The crystalline structure was revealed by preferential oxidation of the amorphous polyethylene by ruthenium tetraoxide. The polymer films were exposed for 120 minutes to ruthenium tetraoxide vapors generated from a solution of 0.2 g ruthenium chloride and 10 mL of a 5.35 weight percent solution of sodium hypochlorite in 100 mL of water. Sections of the plaque having a thickness of 1000 angstroms were cut at room temperature with a Reichert Jung Ultracut E microtome and placed on a 200 copper mesh grid having a polyvinyl Formvar support (the support is available from Electron Microscopy Sciences). Microscopy was done on a JEOL 2000FX TEM operated at an accelerating voltage of 100 kilovolts. The resultant micrographs are set forth in the FIGURES, with 1 mm representing 0.01111 micrometer.

Digital images of certain of the transmission electron micrographs were acquired using a Quantimet 570 digital image analyzer (available from Leica, Inc.), through a CCD video camera. White top hat filters were applied to the optical micrographs before detection of the binaries, i.e., the lamella showed white against a grey background. The filters were disks about 6 nanometers in size. Detection thresholds were set by visually comparing resulting binaries with the original images. Minimal editing of the binaries was done to correct obvious omissions or inclusions encountered in the detection process.

The lengths of the depicted lamella were measured. The lamella in each of the following ranges of length were counted: less than 40 nanometers, 40–60 nanometers, 60–80 nanometers, 80–100 nanometers, 100–120 nanometers, 120–140 nanometers, 140–160 nanometers, 160–180 nanometers, 180–200 nanometers, and greater than 200 nanometers. The average lamellar length was determined. As all lamella in the section were in focus, i.e., there were no lamella hidden by other lamella, the number of lamella per cubic micron was determined by multiplying the number of lamella per square micron by the section thickness, i.e., 1000 angstroms.

We claim:

1. A non-pourable homogeneous ultra-low molecular weight interpolymer of ethylene with at least one $C_3$–$C_{20}$ α-olefin which is characterized as having a number average molecular weight ($M_n$) as determined by gel permeation chromatography, of no more than 11,000, a molecular weight distribution, $M_w/M_n$, as determined by gel permeation chromatography, of from 1.5 to 2.5, a pour point of greater than greater than –30° C., as determined by ASTM Method No. D97, and a density of from 0.850 to 0.889 g/cm$^3$, wherein the ultra-low molecular weight ethylene polymer is further characterized as having lamella greater than 40 nanometers in length when viewed using transmission electron microscopy.

2. The interpolymer of claim 1, wherein the α-olefin is further selected from the group consisting of 1-propene, isobutylene, 1-butene, 1-hexene, 1-heptene, 4-methyl-1-pentene, and 1-octene.

3. The interpolymer of claim 1, wherein the α-olefin is further selected from the group consisting of 1-butene, 1-hexene, 4-methyl-1-pentene, 1-heptene, and 1-octene.

4. The interpolymer of claim 1, wherein the α-olefin is further selected from the group consisting of 1-hexene, 4methyl-1-pentene, 1-heptene, and 1-octene.

5. The interpolymer of claim 1, which is further characterized as being semicrystalline.

6. The interpolymer of claim 5, wherein at least 60 percent of the lamella have a length greater than 40 nanometers.

7. The interpolymer of claim 6, wherein at least 20 percent of the lamella have a length greater than 60 nanometers.

8. The interpolymer of claim 5, wherein at least 80 percent of the lamella have a length greater than 40 nanometers.

9. The interpolymer of claim 8, wherein at least 30 percent of the lamella have a length greater than 60 nanometers.

10. The interpolymer of claim 8, wherein at least 10 percent of the lamella have a length greater than 80 nanometers.

11. The interpolymer of claim 8, wherein at least 40 percent of the lamella have a length greater than 60 nanometers.

12. The interpolymer of claim 8, wherein at least 20 percent of the lamella have a length greater than 80 nanometers.

13. The interpolymer of claim 8, wherein at least 5 percent of the lamella have a length greater than 100 nanometers.

14. The interpolymer of claim 1, wherein the polymer has a density of from 0.850 to 0.869 g/cm$^3$.

15. The interpolymer of claim 1, wherein the polymer has a density of from 0.870 to 0.889 g/cm$^3$.

16. A non-pourable homogeneous interpolymer of ethylene and at least one $C_3$–$C_{20}$ α-olefin, which is characterized as having a number average molecular weight ($M_n$) as determined by gel permeation chromatography, of no more than 11,000, a molecular weight distribution, $M_w/M_n$, as determined by gel permeation chromatography, of from 1.5 to 2.5, a pour point of at least –30° C., as determined by ASTM Method No. D97, and a density of 0.850 to 0.889 g/cm$^3$, wherein the ultra-low molecular weight ethylene polymer is prepared using a constrained geometry catalyst.

17. The interpolymer of claim 16, wherein the α-olefin is further selected from the group consisting of 1-propene, isobutylene, 1-butene, 1-hexene, 1-heptene, 4-methyl-1-pentene, and 1-octene.

18. The interpolymer of claim 16, wherein the α-olefin is further selected from the group consisting of 1-butene, 1-hexene, 4methyl-1-pentene, 1-heptene, and 1-octene.

19. The interpolymer of claim 16, wherein the comonomer is an ethylenically unsaturated monomer which is a $C_5$–$C_{20}$ α-olefin.

20. The interpolymer of claim 16, wherein the comonomer is an ethylenically unsaturated monomer which is a $C_6$–$C_{20}$ α-olefin.

* * * * *